United States Patent
Liu et al.

(10) Patent No.: US 10,501,688 B2
(45) Date of Patent: Dec. 10, 2019

(54) ENHANCED WAVELENGTH CONVERTING STRUCTURE

(71) Applicant: Industrial Technology Research Institute, Hsinchu Hsien (TW)

(72) Inventors: Yi-Chun Liu, Chutung (TW); Pao-Ju Hsieh, Chutung (TW); Mei-Chih Peng, Chutung (TW)

(73) Assignee: Industrial Technology Research Institute, Chutung (TW)

( * ) Notice: Subject to any disclaimer, the term of this patent is extended or adjusted under 35 U.S.C. 154(b) by 670 days.

(21) Appl. No.: 14/976,213

(22) Filed: Dec. 21, 2015

(65) Prior Publication Data

US 2016/0177181 A1 Jun. 23, 2016

(30) Foreign Application Priority Data

Dec. 22, 2014 (TW) .............................. 103144724 A
Aug. 5, 2015 (TW) .............................. 104125375 A

(51) Int. Cl.
| C09K 19/02 | (2006.01) |
| C09K 11/70 | (2006.01) |
| F21V 8/00 | (2006.01) |
| C09K 11/88 | (2006.01) |
| C09K 11/56 | (2006.01) |
| C09K 19/52 | (2006.01) |

(52) U.S. Cl.
CPC .......... C09K 11/703 (2013.01); C09K 11/565 (2013.01); C09K 11/883 (2013.01); G02B 6/005 (2013.01); C09K 2019/521 (2013.01)

(58) Field of Classification Search
USPC ...... 428/432; 349/43, 193, 62; 345/691, 690
See application file for complete search history.

(56) References Cited

U.S. PATENT DOCUMENTS

| 8,081,289 B2 | 12/2011 | Lin et al. |
| 8,684,546 B2 | 4/2014 | Ninan |
| 2012/0113672 A1 | 5/2012 | Dubrow et al. |
| 2012/0154464 A1* | 6/2012 | Ninan ................ G02B 27/2264 345/691 |
| 2012/0154465 A1* | 6/2012 | Kudo .................. G09G 3/3611 345/691 |
| 2012/0320298 A1* | 12/2012 | Suzuki .............. G02F 1/133553 349/43 |
| 2013/0335677 A1 | 12/2013 | You |

FOREIGN PATENT DOCUMENTS

| CN | 1942997 A | 4/2007 |
| CN | 202511145 U | 10/2012 |
| CN | 103228983 A | 7/2013 |
| TW | 201007250 A | 2/2010 |
| WO | WO2013175317 | * 11/2013 |
| WO | WO-2013175317 A1 | 11/2013 |

OTHER PUBLICATIONS

Chen et.al., "An optically stable and tunable quantum dot nanocrystal-embedded cholesteric liquid crystal composite laser," *J. Mater. Chem. C.*, 2(22):4388-4394 (2014).
Coe-Sullivan et al., "Quantum Dots for LED Down conversion in Display Applications," *ECS Journal of Solid State Science and Technology*, 2(2):R3026-R3030 (2013).
Kurtin et al, "Quantum Dots for High Color Gamut LCD Displays using an On-Chip LED Solution," *SID Symposium Digest of Technical Papers*, pp. 146-148 (2014).
Luo et al., "Wide color gamut LCD with a quantum dot backlight," *Optics Express*, 21(22):26269-26284 (2013).
Luo and Wu, "A Spatiotemporal Four-Primary Color LCD With Quantum Dots," *IEEE, Journal of Display Technology*, 10(5):367-372 (2014).
Luo et al., "Quantum dots: a new era for liquid crystal display backlight," *SPIE Newsroom*, 3 pages (2014).
CN 202511145 U English abstract.
TW 201007250 English abstract.
CN 1942997 English Abstract.
CN 103228983 English Abstract.
Office Action dated Jul. 29, 2016 in TW 10520943480.

* cited by examiner

*Primary Examiner* — Monique R Peets
(74) *Attorney, Agent, or Firm* — McCarter & English LLP; Yu Lu

(57) ABSTRACT

The present disclosure provides an enhanced wavelength converting structure. The enhanced wavelength converting structure includes a first crosslinked cholesteric liquid crystal layer and a plurality of first quantum dots dispersed in the first crosslinked cholesteric liquid crystal layer. When a first light is incident into the enhanced wavelength converting structure, the plurality of first quantum dots are excited and emit a second light of a wavelength different from a wavelength of the first light, and the second light is toned up via multiple reflections in the first crosslinked cholesteric liquid crystal layer. The present disclosure further provides a luminescent film and a display backlighting unit.

29 Claims, 16 Drawing Sheets

ENHANCED WAVELENGTH CONVERTING STRUCTURE

REFERENCE TO RELATED APPLICATIONS

This application claims foreign priority under 35 U.S.C. § 119(a) to Patent Application No. 103144724, filed on Dec. 22, 2014, and to Patent Application No. 104125375, filed on Aug. 5, 2015, both in the Intellectual Property Office of Ministry of Economic Affairs, Republic of China (Taiwan, R.O.C.), the entire contents of both of the above-referenced applications are incorporated herein by reference.

TECHNICAL FIELD

The disclosure relates to an enhanced wavelength converting structure, and an enhanced wavelength converting structure incorporating with a cholesteric liquid crystal and quantum dots.

BACKGROUND OF THE INVENTION

Currently, backlight modules for liquid crystal displays (LCDs) mostly employ YAG phosphor LEDs to produce a source of white light, which passes through RGB color filters to produce the final output spectrum for the LCDs. Filters can only faithfully render the tones of the backlight modules. The main issue associated with current backlight modules is that the blue light is too strong, while the distributions of the green and red lights are too wide, resulting in a small color gamut. The imbalance of colors may also affect viewers' vision.

It has been proposed a technique for the LCD backlight modules that incorporate with quantum dots (QDs). Conventional LCDs generally comprise a liquid crystal panel and a backlight module. The backlight module includes a light source, a light guide plate (LGP), a reflector and other components. A quantum dot (QD) sheet is disposed above the LGP. In general, the properties of quantum dots include high fluorescent intensity, good light stability, and the ability to excite light waves of a variety of different wavelengths from a single wavelength of light.

Although the use of the QD sheet facilitates balance between the RGB colors, when applied to a liquid crystal display with a large area, the use of a large amount of quantum dots entails high costs. A method for reducing the amount of quantum dots being used is to add scattering particles in the QD sheet to compensate for efficiency; however, this would reduce the transmittance of the sheet.

Therefore, there is still a need for a solution that reduces the amount of quantum dots used while still maintaining high quantum efficiency.

SUMMARY OF THE INVENTION

The present disclosure provides an enhanced wavelength converting structure, which includes: a first crosslinked cholesteric liquid crystal layer; and a plurality of first quantum dots dispersed in the first crosslinked cholesteric liquid crystal layer, wherein when a first light is incident into the enhanced wavelength converting structure, the plurality of first quantum dots are excited by the first light and emit a second light of a wavelength different from a wavelength of the first light.

In an embodiment, the enhanced wavelength converting structure further comprises a substrate, wherein the first crosslinked cholesteric liquid crystal layer is disposed on the substrate.

In another embodiment, the substrate is a barrier layer.

In another embodiment, the enhanced wavelength converting structure further comprising barrier layer, wherein the barrier layer is disposed on the first crosslinked cholesteric liquid crystal layer, and the first crosslinked cholesteric liquid crystal layer is sandwiched between the barrier layer and substrate.

In an embodiment of the substrate being a barrier layer, the first crosslinked cholesteric liquid crystal layer is sandwiched between the both barrier layers.

In one embodiment, the enhanced wavelength converting structure further includes a plurality of second quantum dots dispersed in the first crosslinked cholesteric liquid crystal layer, and the second quantum dots are different from the first quantum dots.

In another embodiment, the enhanced wavelength converting structure further includes a second crosslinked cholesteric liquid crystal layer disposed on the first crosslinked cholesteric liquid crystal layer, and a plurality of second quantum dots dispersed in the second crosslinked cholesteric liquid crystal layer, wherein when the first light is incident into the enhanced wavelength converting structure, the plurality of second quantum dots are excited by the first light and emit a third light of a wavelength different from a wavelength of the first light.

The present disclosure further provides a luminescent film, which includes an enhanced wavelength converting structure of the present disclosure, and at least one optical film disposed on a surface of the enhanced wavelength converting structure. Preferably, the optical film is a prism brightness enhancement film, a cholesteric liquid crystal reflective polarizer, a multilayer reflective polarizer or a diffuser film.

The present disclosure further provides a display backlighting unit, which includes: at least one primary light source emitting primary light; a light guide panel (LGP) optically coupled to the at least one primary light source and configured to uniformly transmit the primary light through the LGP; and an enhanced wavelength converting structure of the present disclosure disposed over the LGP.

Thus, it is clear that in the enhanced wavelength converting structure of the present disclosure, when the quantum dots in the crosslinked cholesteric liquid crystal layer have absorbed light waves of a higher energy, the electrons can jump to a higher energy level, and when the electrons return from the higher energy level to a lower energy level, light having a longer wavelength will be emitted. Quantum dots with different particle sizes will emit light with different wavelengths. In addition, since the crosslinked cholesteric liquid crystal layer follows the Bragg's law, the wavelength range of the reflected lights can be adjusted by adjusting the pitch of the liquid crystal. Furthermore, the crosslinked cholesteric liquid crystal provides the microcavities mechanism, such that the excitation light of the quantum dots and the microcavities of the crosslinked cholesteric liquid crystal are coupled to each other, thereby increasing the coherency as well as the intensity of the excitation light. Moreover, the quantum dots are dispersed at a nanoscale in the resin, and high film transparency reduces optical loss. Therefore, the enhanced wavelength converting structure of the present disclosure can significantly reduce the amount of quantum dots being used while still maintaining high quantum efficiency.

BRIEF DESCRIPTION OF THE DRAWINGS

The present disclosure can be more fully understood by reading the following detailed descriptions of the preferred embodiments, with reference made to the accompanying drawings.

DETAILED DESCRIPTION OF THE EMBODIMENTS

The present disclosure is described by the following specific embodiments. Those with ordinary skills in the art can readily understand other advantages and effects of the present disclosure after reading the disclosure of this specification. The present disclosure may also be practiced or applied with other different implementations. Based on different contexts and applications, the various details in this specification can be modified and changed without departing from the spirit of the present disclosure.

Figure 1:
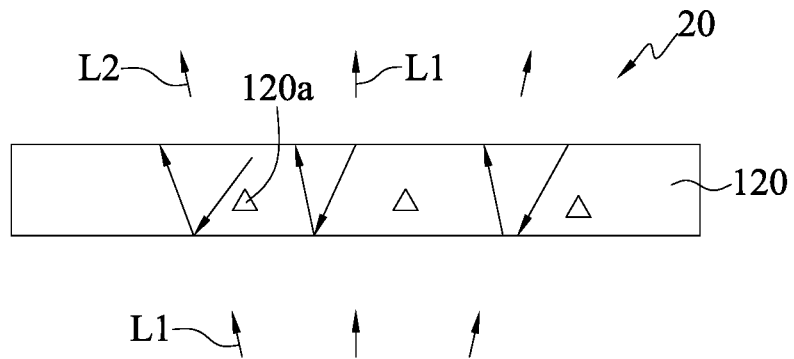
FIG. 1 is a schematic diagram illustrating an enhanced wavelength converting structure in accordance with an embodiment of the present disclosure.

FIG. 1 is a schematic diagram illustrating an enhanced wavelength converting structure in accordance with a preferred embodiment of the present disclosure. Referring to FIG. 1, the enhanced wavelength converting structure 20 includes a first crosslinked cholesteric liquid crystal layer 120 and a plurality of first quantum dots (QDs) 120a, and the plurality of QDs 120a are dispersed in the first crosslinked cholesteric liquid crystal layer 120.

The enhanced wavelength converting structure 20 of FIG. 1 is provided on a light source or on the transmission path of a light source. For example, a first light L1 of a light source is incident into the first crosslinked cholesteric liquid crystal layer 120 which converts the first light L1 into a second light L2. When the first light L1 enters the enhanced wavelength converting structure 20, the first QDs 120a are excited by the first light L1 to emit the second light L2. The second light L2 is reflected multiple times in the first crosslinked cholesteric liquid crystal layer 120, wherein the wavelength of the second light L2 is different from that of the first light L1. Preferably, the wavelength of the first light L1 is ranged between 420 nm and 460 nm, and the wavelength of the second light L2 is ranged between 520 nm and 580 nm.

Figure 2:
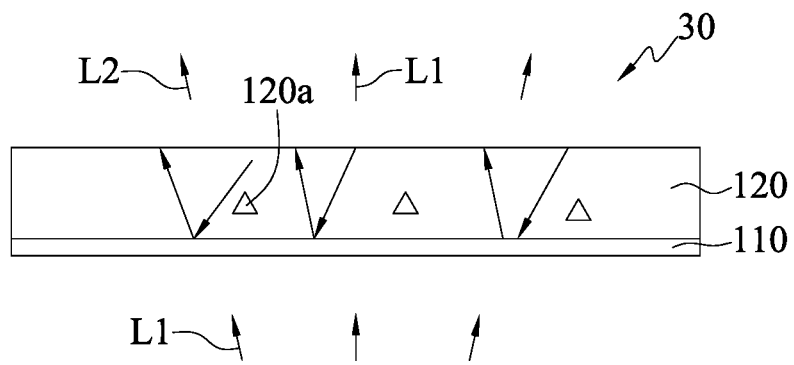
FIG. 2 is a schematic diagram illustrating an enhanced wavelength converting structure in accordance with another embodiment of the present disclosure.

FIG. 2 is a schematic diagram illustrating an enhanced wavelength converting structure in accordance with a preferred embodiment of the present disclosure. Referring to FIG. 2, an enhanced wavelength converting structure 30 is a multilayer composite structure, which includes a substrate 110, a first crosslinked cholesteric liquid crystal layer 120 and a plurality of first quantum dots (QDs) 120a, wherein the first crosslinked cholesteric liquid crystal layer 120 is formed above the substrate 110, and the plurality of QDs 120a are dispersed in the first crosslinked cholesteric liquid crystal layer 120.

The enhanced wavelength converting structure 30 of FIG. 2 is provided on a light source or on the transmission path of a light source. For example, a first light L1 of a light source is incident into the substrate 110. The first crosslinked cholesteric liquid crystal layer 120 converts the first light L1 into a second light L2. When the first light L1 enters the enhanced wavelength converting structure 30, the first QDs 120a are excited by the first light L1 to emit the second light L2. The second light L2 is reflected multiple times in the first crosslinked cholesteric liquid crystal layer 120, wherein the wavelength of the second light L2 is different from that of the first light L1. Preferably, the wavelength of the first light L1 is ranged between 420 nm and 460 nm, and the wavelength of the second light L2 is ranged between 520 nm and 580 nm.

Figure 3:
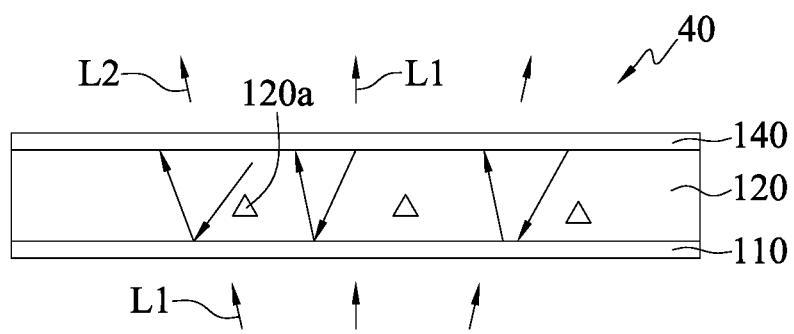
FIG. 3 is a schematic diagram illustrating an enhanced wavelength converting structure in accordance with still another embodiment of the present disclosure.

FIG. 3 is a schematic diagram illustrating an enhanced wavelength converting structure in accordance with another embodiment of the present disclosure. Referring to FIG. 3, the enhanced wavelength converting structure 40 further includes a substrate 110 disposed under the first crosslinked cholesteric liquid crystal layer 120, and a barrier layer 140 above the first crosslinked cholesteric liquid crystal layer 120. In the embodiment, the substrate is a barrier layer, and the first crosslinked cholesteric liquid crystal layer is sandwiched between the both barrier layers for protecting the first QDs 120a in the first crosslinked cholesteric liquid crystal layer 120 from external influences such as water and oxygen.

Figure 4:
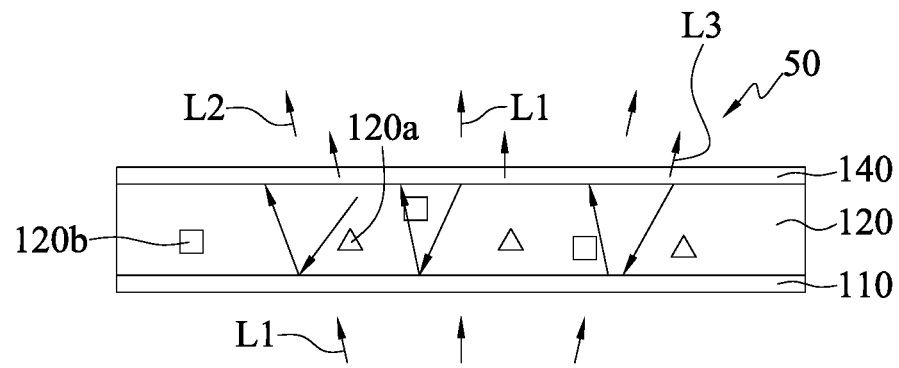
FIG. 4 is a schematic diagram illustrating an enhanced wavelength converting structure in accordance with yet another embodiment of the present disclosure.

FIG. 4 is a schematic diagram illustrating an enhanced wavelength converting structure in accordance with yet another embodiment of the present disclosure. Referring to FIG. 4, the enhanced wavelength converting structure 50 is a multilayer composite structure, which includes a substrate 110, a first crosslinked cholesteric liquid crystal layer 120, a plurality of first QDs 120a and a plurality of second QDs 120b, wherein the first crosslinked cholesteric liquid crystal layer 120 is disposed on the substrate 110. The plurality of first QDs 120a and the plurality of second QDs 120b are dispersed in the first crosslinked cholesteric liquid crystal layer 120. The first QDs 120a are different from the second QDs 120b. The enhanced wavelength converting structure 50 is provided on a light source or on the transmission path of a light source. For example, the first light L1 of a light source is incident into the substrate 110. The first crosslinked cholesteric liquid crystal layer 120 converts the first light L1 into a second light L2 and a third light L3. When the first light L1 enters the enhanced wavelength converting structure 50, the first QDs 120a and the second QDs 120b are excited by the first light L1 to emit the second light L2 and the third light L3, respectively, wherein the wavelengths of the second light L2 and the third light L3 are different from the wavelength of the first light L1.

In this embodiment, the enhanced wavelength converting structure 50 further includes a substrate 110 disposed under the first crosslinked cholesteric liquid crystal layer 120, and a barrier layer 140 disposed above the first crosslinked cholesteric liquid crystal layer 120. In the embodiment, the substrate is a barrier layer, and the first crosslinked cholesteric liquid crystal layer is sandwiched between the both barrier layers for protecting the first and second QDs 120a and 120b in the first crosslinked cholesteric liquid crystal layer 120 from external influences such as moisture and oxygen.

Figure 5:
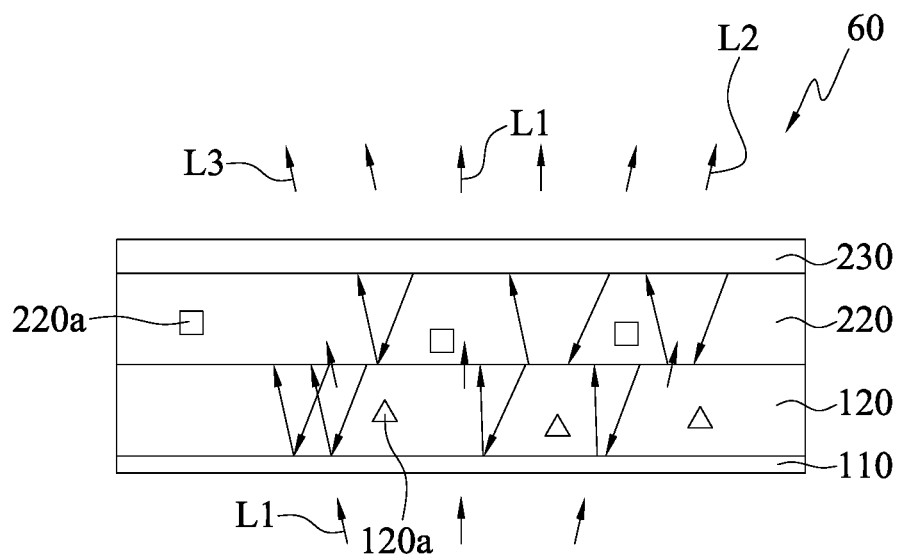
FIG. 5 is a schematic diagram illustrating an enhanced wavelength converting structure in accordance with yet still another embodiment of the present disclosure.

FIG. 5 is a schematic diagram illustrating an enhanced wavelength converting structure in accordance with still another embodiment of the present disclosure. Referring to FIG. 5, an enhanced wavelength converting structure 60 is a multilayer composite structure, which includes a substrate 110, a first crosslinked cholesteric liquid crystal layer 120, a plurality of first QDs 120a, a second crosslinked cholesteric liquid crystal layer 220, a plurality of second QDs 220a and a barrier layer 230, wherein the first crosslinked cholesteric liquid crystal layer 120 is disposed on the substrate 110, and the second crosslinked cholesteric liquid crystal layer 220 is disposed on the first crosslinked cholesteric liquid crystal layer 120. The plurality of first QDs 120a are dispersed in the first crosslinked cholesteric liquid crystal layer 120, and the plurality of second QDs 220a are dispersed in the second crosslinked cholesteric liquid crystal layer 220. The substrate 110 is disposed under the first crosslinked cholesteric liquid crystal layer 120, and the barrier layer 230 is disposed on top of the second crosslinked cholesteric liquid crystal layer 220. The enhanced wavelength converting structure 60 is provided on a light source. The first light L1 of the light source is incident into the substrate 110. When the first light L1 enters the enhanced wavelength converting structure 60, the first QDs 120a dispersed in the first crosslinked cholesteric liquid crystal layer 120 are excited by the first light L1 to emit a second light L2. The second light L2 is reflected multiple times in the first crosslinked cholesteric liquid crystal layer 120, thereby increasing the intensity of the light. The second light L2 comes out of the first crosslinked cholesteric liquid crystal layer 120 and enters into the second crosslinked cholesteric liquid crystal layer 220. Since the pitch of the second crosslinked cholesteric liquid crystal layer 220 is different from the pitch of the first crosslinked cholesteric liquid crystal layer 120, the second light L2 will not be reflected in the second crosslinked cholesteric liquid crystal layer 220; rather, it comes straight out of the second crosslinked cholesteric liquid crystal layer 220. Meanwhile, the second QDs 220a in the second crosslinked cholesteric liquid crystal layer 220 are excited by the first light L1 to emit a third light L3. The wavelength of the second light L2 is different from the wavelength of the first light L1, and the wavelength of the third light L3 is different from the wavelength of the second light L2. Preferably, the wavelength of the first light L1 is ranged between 420 nm and 460 nm; the wavelength of the second light L2 is ranged between 520 nm and 580 nm; and the wavelength of the third light L3 is ranged between 600 nm and 680 nm.

In the enhanced wavelength converting structures 20, 30, 40, 50 and 60 of the present disclosure, the materials of the first and second crosslinked cholesteric liquid crystal layers 120 and 220 include, but are not limited to, the compounds shown in the following formulas (1) to (4):

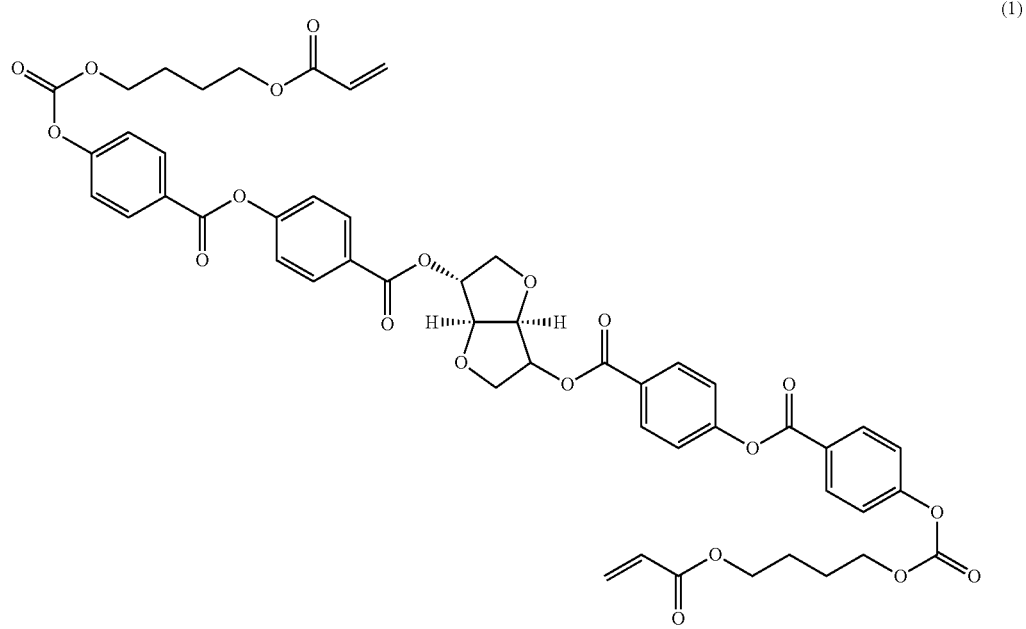 [SMILES: C=CC(=O)OCCCCOC(=O)Oc1ccc(C(=O)Oc2ccc(C(=O)OC3CO[C@H]4[C@H](OC(=O)c5ccc(OC(=O)c6ccc(OC(=O)OCCCCOC(=O)C=C)cc6)cc5)CO[C@@H]34)cc2)cc1]
1,4:3,6-Dianhydro-D-glucitol bis [4-[[4-[[[4-[(1-oxo-2-propenyl)oxy]butoxy]carbonyl]oxy]benzoyl]oxy]benzoate]
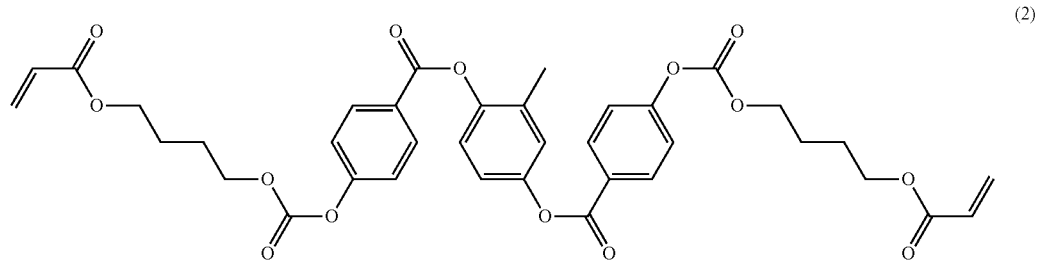 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]
4-[[[4-[(1-Oxo-2-propenyl)oxy]butoxy]carbonyl]oxy]benzoic acid 2-methyl-1,4-phenylene ester
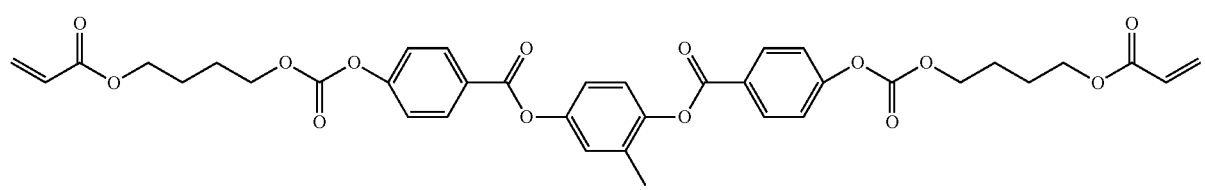

2-methyl-1,4-phenylene bis(4-(((4-(acryloyloxy)
butoxy)carbonyl)oxy)benzoate

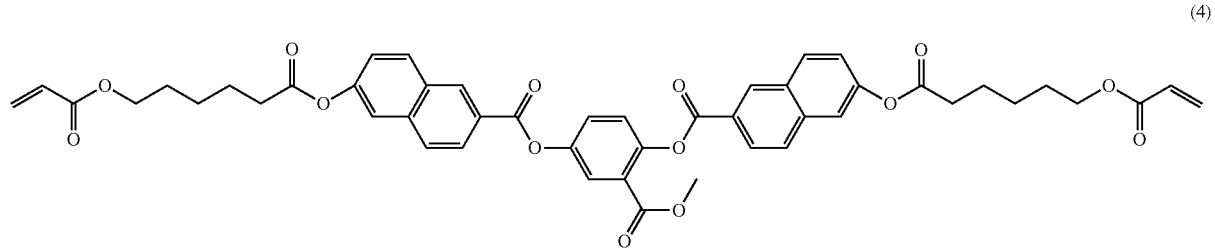 [SMILES: C=CC(=O)OCCCCCC(=O)Oc1ccc2cc(C(=O)Oc3ccc(OC(=O)c4ccc5cc(OC(=O)CCCCCOC(=O)C=C)ccc5c4)c(C(=O)OC)c3)ccc2c1]

(4)

2-(methoxycarbonyl)-1,4-phenylene bis(6-((6-(acryloyloxy)hexanoyl)oxy)-2-naphthoate The materials are polymerizable cholesteric liquid crystals. The first and second crosslinked cholesteric liquid crystal layers are made by coating a solution of a solvent mixed with polymerizable cholesteric liquid crystals onto a first barrier layer, followed by irradiation with a UV light to cure into a film.

In the enhanced wavelength converting structures 30, 40, 50 and 60 of the present disclosure, the materials of the substrate 110 include, but are not limited to, glass, polymethyl methacrylate (PMMA), polystyrene (PS), methyl styrene (MS), polycarbonate (PC), and triacetate cellulose (TAC).

In the enhanced wavelength converting structures 30, 40, 50 and 60 of the present disclosure, when the substrate 110 is a barrier layer, the materials of the substrate 110 and the barrier layers 140 and 230 include, but are not limited to, any film that can protect the first and second QDs 120a, 120b and 220a from being influenced by oxygen and water in the environment. Appropriate materials for the barrier layers include polymers (e.g., polyethylene terephthalate (PET)), glass, dielectric materials, and oxides (e.g., silicon oxide ($SiO_2$ and $Si_2O_3$), titanium oxide ($TiO_2$), aluminum oxide ($Al_2O_3$) or a combination of any two of the above). In order to achieve an optimal barrier effect, a single layer or a stack of two or more layers of polymer films can be used. Alternatively, a polymer film in combination with an appropriate oxide can be used to better achieve the isolation of oxygen and water.

In the enhanced wavelength converting structures 20, 30, 40, 50 and 60 of the present disclosure, the first and second QDs 120a, 120b and 220a are dispersed in nanoscale in the first and second crosslinked cholesteric liquid crystal layers 120 and 220. Furthermore, the first and second crosslinked cholesteric liquid crystal layers 120 and 220 include liquid crystals and optically active substances, and the first and second QDs 120a, 120b and 220a are selected from at least one of the group consisting of a Group II-VI compound, a Group III-V compound and a Group IV-VI compound.

Preferably, the Group II-VI compound is CdSe; the Group IV-VI compound is PbS; and the Group III-V compound is InP. More preferably, the quantum dot is a quantum dot of a core/shell (core-shell) structure in addition to a core structure, of which a core is coated by at least one outer shell, including CdSe/ZnS, PbS/ZnS or InP/ZnS. The core or core/shell quantum dot is further capped with one or more ligands, preferably organic ligands, to facilitate dispersion of the QDs in the crosslinked cholesteric liquid crystal layers.

Taking CdSe/ZnS quantum dots as an example, about 1% of CdSe/ZnS quantum dots by weight are incorporated into the crosslinked cholesteric liquid crystal layer. The reflection band of the crosslinked cholesteric liquid crystal layer is approximately from 500 nm to 550 nm. The luminance gain can reach as high as eight times.

Compared to prior art, the enhanced wavelength converting structure of the present disclosure uses a mixture of the crosslinked cholesteric liquid crystal and the quantum dots that can increase the gain and transmittance of the light, thereby reducing the amount of quantum dots being used while maintaining quantum efficiency.

EMBODIMENTS

Embodiment 1—Preparation of the Enhanced Wavelength Converting Structure Using a CdSe/ZnS Quantum Dot Compound Polymerizable cholesteric liquid crystal materials BASF 242 (commercially available from BASF, product number 242) and BASF 756 (commercially available from BASF, product number 756) from formula (3) in a weight ratio of BASF 242:BASF 756=95:5 were mixed with toluene to form a 40 wt % solution while adding 1 wt % of the UV photoinitiator Irgacure 907 (commercially available from Ciba Geigy). The mixture was stirred at 90° C. for 1 to 2 hours until completely dissolved. A toluene solution with 15% CdSe/ZnS (available from Ocean Nanotech, Product No. QSP-540-10) quantum dots was then added. This solution will have a final concentration of 1 wt % quantum dots in the cured crosslinked cholesteric liquid crystal layer. The quantum dots are capable of absorbing a blue LED light source in the range of between 420 and 460 nm and emitting green light with excitation wavelengths between 520 to 580 nm. The mixture was then stirred at room temperature for 24 hours. Next, the mixed solution was coated with a doctor blade onto a 50 μm-thick PET film and dried at 80° C. for 2 minutes, followed by irradiation with a UV light (100 W/cm$^2$) for 20 seconds to cure into a film with a thickness of about 6 to 7 μm. Upper and lower barrier layers are bonded to the film to form a wavelength converting structure containing CdSe/ZnS quantum dots. Moreover, another crosslinked cholesteric liquid crystal layer was prepared in the same manner as described above but without the addition of 15% CdSe/ZnS quantum dots and without the upper and lower barrier layers.

Figure 6A:
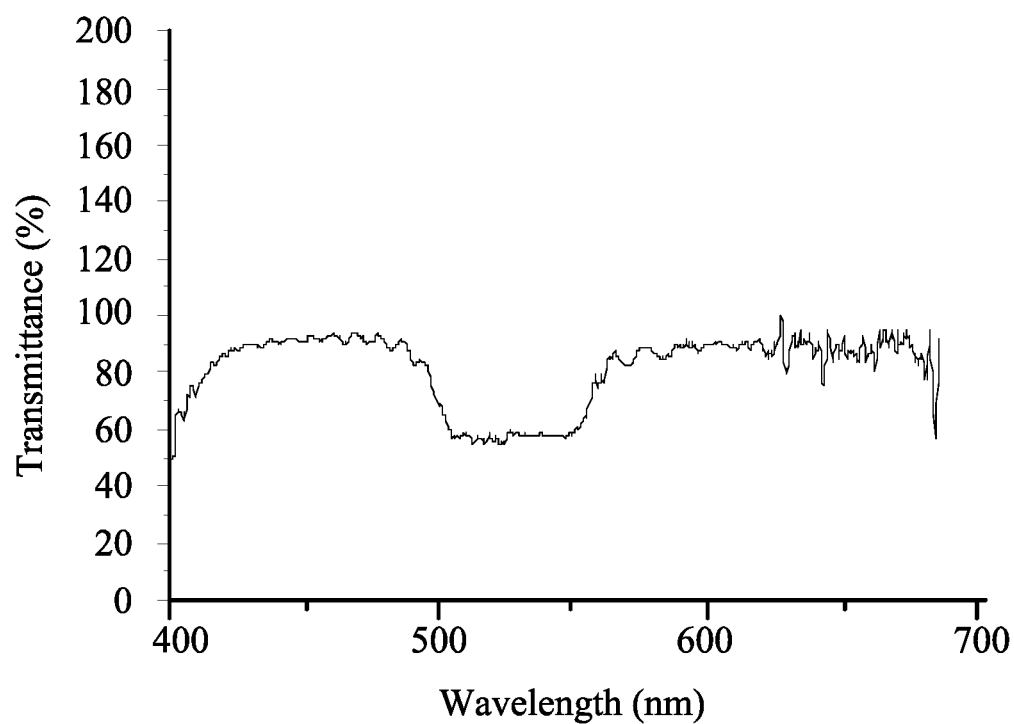
FIG. 6A is a graph showing the transmittance profile of a crosslinked cholesteric liquid crystal.
Figure 6B:
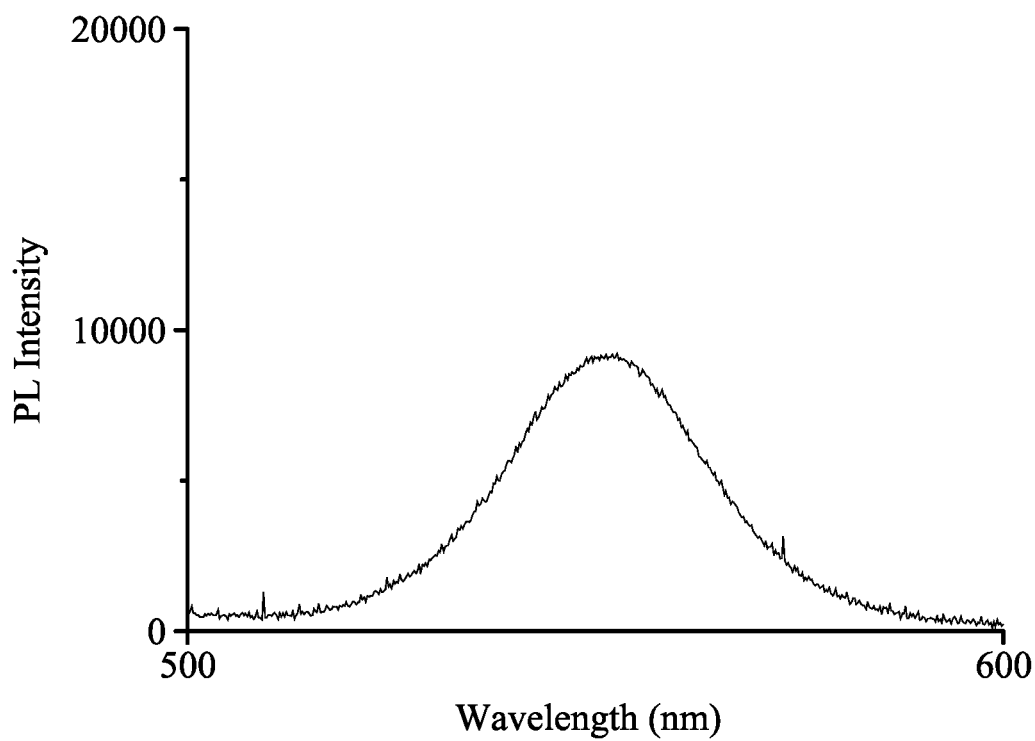
FIG. 6B is a graph showing the photoluminescence profile of an enhanced wavelength converting structure of the present disclosure using CdSe/ZnS quantum dots.

FIG. 6A is a graph showing the transmittance profile of the light through the crosslinked cholesteric liquid crystal layer without the CdSe/ZnS quantum dots. The result shows that, in the band of from 500 nm to 550 nm, the light undergoes Bragg reflection in the cholesteric liquid crystal, and its transmittance decreases from 90% to 60%. FIG. 6B is a graph showing the photoluminescence (hereinafter referred to as PL) profile of the wavelength converting structure containing the CdSe/ZnS quantum dots. The result shows that its PL wavelength is at about 550 nm.

Embodiment 2—Preparation of Enhanced Wavelength Converting Structure Using PbS/ZnS Quantum Dot Compound BASF 242 and BASF 756 with a weight ratio of 97.2 to 2.8 were mixed with toluene to form a 40 wt % solution while adding 1 wt % of the UV photoinitiator Irgacure 907. The mixture was stirred at 90° C. for 1 to 2 hours until completely dissolved. A toluene solution with 15% PbS/ZnS (commercially available from Evident Technologies, Product No. ED-P20-TOL-0850) quantum dots was then added. This solution will have a final concentration of 1 wt % quantum dots in the cured crosslinked cholesteric liquid crystal layer. The quantum dots are capable of absorbing an LED light source in the range of between 700 and 760 nm and emitting near infrared (NIR) light with excitation wavelengths between 800 and 900 nm. The mixture was then stirred at room temperature for 24 hours. Next, the mixed solution was coated with a doctor blade onto a 50 μm-thick PET film and dried at 80° C. for 2 minutes, followed by irradiation with a UV light (100 W/cm$^2$) for 20 seconds to cure into a film with a thickness of about 6 to 7 μm. Upper and lower barrier layers are bonded to the film to form a wavelength converting structure containing PbS/ZnS quantum dots. Moreover, another crosslinked cholesteric liquid crystal layer was prepared in the same manner as described above but without the addition of 15% PbS/ZnS quantum dots and without the upper and lower barrier layers.

Figure 7A:
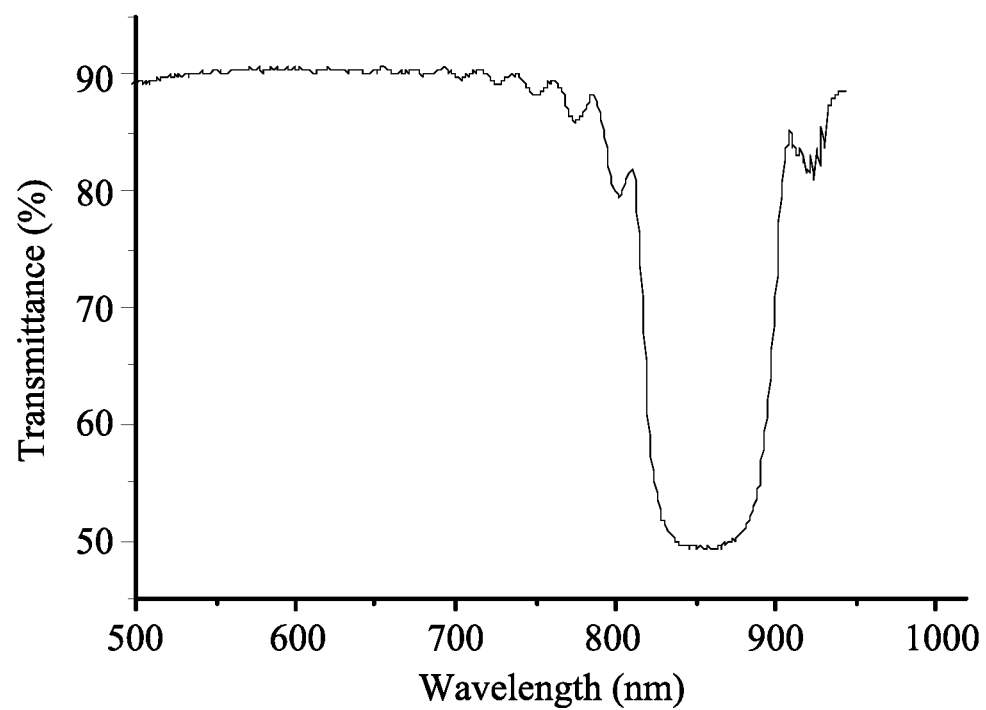
FIG. 7A is a graph showing the transmittance profile of a crosslinked cholesteric liquid crystal.
Figure 7B:
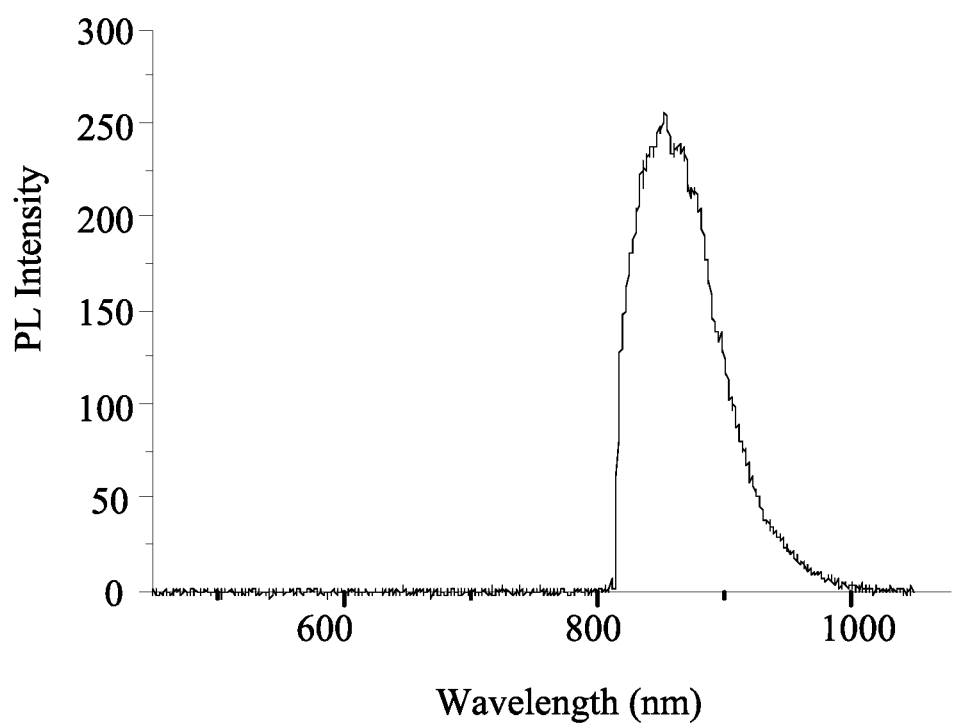
FIG. 7B is a graph showing the photoluminescence profile of an enhanced wavelength converting structure of the present disclosure using PbS/ZnS quantum dots.

FIG. 7A is a graph showing the transmittance profile of the light through the crosslinked cholesteric liquid crystal layer without the PbS/ZnS quantum dots. The result shows that, in the band between 830 nm and 860 nm, the light undergoes Bragg reflection in the cholesteric liquid crystal, and its transmittance decreases from 90% to 60%. FIG. 7B is a graph showing the PL profile of the wavelength converting structure containing the PbS/ZnS quantum dots. The result shows that its PL wavelength is at about 850 nm.

Embodiment 3—Preparation of Enhanced Wavelength Converting Structure Using InP/ZnS Quantum Dot Compound BASF 242 and BASF 756 with a weight ratio of 95 to 5 were mixed with toluene to form a 40 wt % solution while adding 1 wt % of the UV photoinitiator Irgacure 907. The mixture was stirred at 90° C. for 1 to 2 hours until completely dissolved. A toluene solution with 15% InP/ZnS (commercially available from SIGMA-ALDRICH, Product No. 56612 SIGMA) quantum dots was then added. This solution will have a final concentration of 1 wt % quantum dots in the cured crosslinked cholesteric liquid crystal layer. The quantum dots are capable of absorbing a blue LED light source in the range of between 420 nm and 460 nm and emitting green light with excitation wavelengths between 520 nm and 580 nm. The mixture was then stirred at room temperature for 24 hours. Next, the mixed solution was coated with a doctor blade onto a 50 μm-thick PET film and dried at 80° C. for 2 minutes, followed by irradiation with a UV light (100 W/cm$^2$) for 20 seconds to cure into a film with a thickness of about 6 to 7 μm. Upper and lower barrier layers are bonded to the film to form a wavelength converting structure containing InP/ZnS quantum dots. Moreover, another crosslinked cholesteric liquid crystal layer was prepared in the same manner as described above but without the addition of 15% InP/ZnS quantum dots and without the upper and lower barrier layers.

Figure 8A:
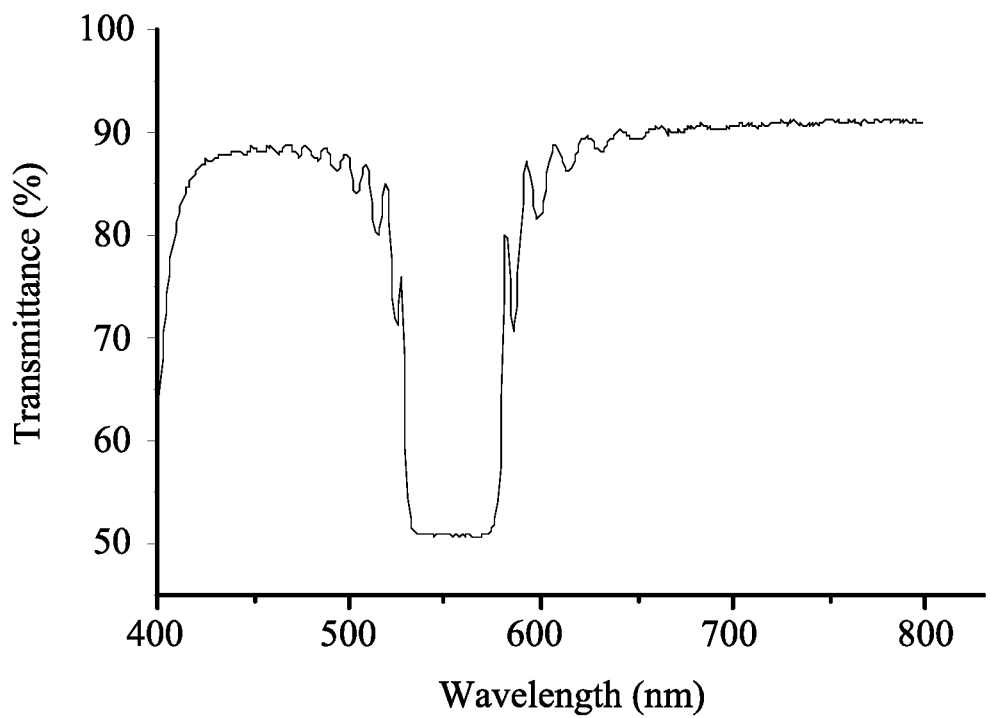
FIG. 8A is a graph showing the transmittance profile of a crosslinked cholesteric liquid crystal.
Figure 8B:
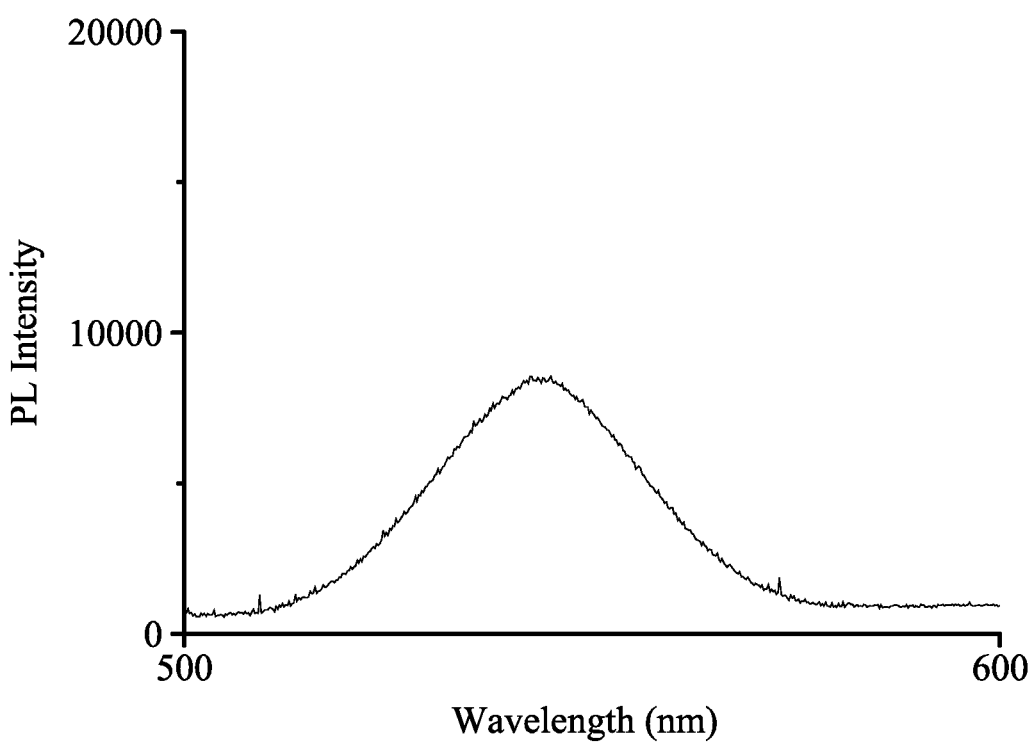
FIG. 8B is a graph showing the photoluminescence profile of an enhanced wavelength converting structure of the present disclosure using InP/ZnS quantum dots.

FIG. 8A is a graph showing the transmittance profile of the light through the crosslinked cholesteric liquid crystal layer without the InP/ZnS quantum dots. The result shows that, in the band between 530 nm and 580 nm, the light undergoes Bragg reflection in the cholesteric liquid crystal, and its transmittance decreases from 90% to 50%. FIG. 8B is a graph showing the PL profile of the wavelength converting structure containing the InP/ZnS quantum dots. The result shows that its PL wavelength is at about 540 nm.

Embodiment 4—Preparation of Enhanced Wavelength Converting Structure Using CdSe/ZnS Quantum Dot Compound BASF 242 and BASF 756 with a weight ratio of 95:5 were mixed with toluene to form a 40 wt % solution while adding 1 wt % of the UV photoinitiator Irgacure 907. The mixture was stirred at 90° C. for 1 to 2 hours until completely dissolved. A toluene solution with 15% CdSe/ZnS (available from Ocean Nanotech, Product No. QSP-620-10) quantum dots was then added. This solution will have a final concentration of 1 wt % quantum dots in the cured crosslinked cholesteric liquid crystal layer. The quantum dots are capable of absorbing a blue LED light source in the range of between 420 nm and 460 nm and emitting red light with excitation wavelengths between 600 nm and 680 nm. The mixture was then stirred at room temperature for 24 hours. Next, the mixed solution was coated with a doctor blade onto PET film with a thickness of 50 μm and dried at 80° C. for 2 minutes, followed by irradiation with a UV light (100 W/cm$^2$) for 20 seconds to cure into a film with a thickness of about 8 μm. Upper and lower barrier layers are bonded to the film to form a wavelength converting structure containing CdSe/ZnS quantum dots. Moreover, another crosslinked cholesteric liquid crystal layer was prepared in the same manner as described above but without the addition of 15% CdSe/ZnS quantum dots and without the upper and lower barrier layers.

Figure 9A:
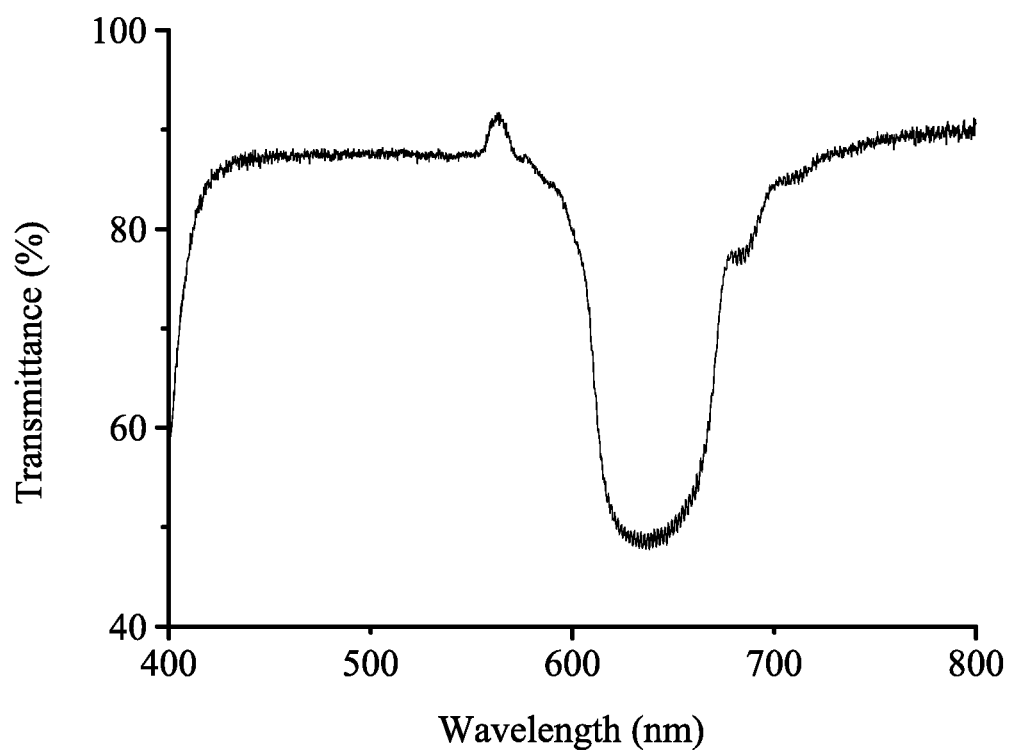
FIG. 9A is a graph showing the transmittance profile of a crosslinked cholesteric liquid crystal.
Figure 9B:
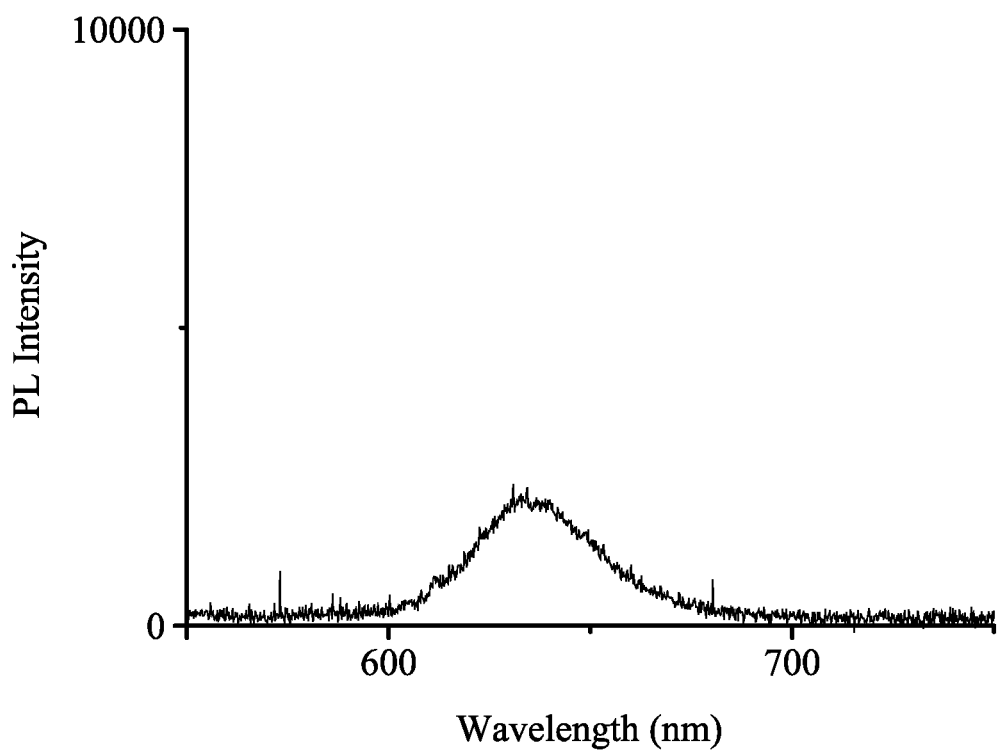
FIG. 9B is a graph showing the photoluminescence profile of an enhanced wavelength converting structure of the present disclosure using another type of CdSe/ZnS quantum dots.

FIG. 9A is a graph showing the transmittance profile of the light through the crosslinked cholesteric liquid crystal layer without the CdSe/ZnS quantum dots. The result shows that, in the band of from 600 nm to 680 nm, the light undergoes Bragg reflection in the cholesteric liquid crystal, and its transmittance decreases from 90% to 50%. FIG. 9B is a graph showing the PL profile of the wavelength converting structure containing the CdSe/ZnS quantum dots. The result shows that its PL wavelength is at about 630 nm.

Embodiment 5—Preparation of Enhanced Wavelength Converting Structure with Two Crosslinked Cholesteric Liquid Crystal Layers BASF 242 and BASF 756 with a weight ratio of 95:5 were mixed with toluene to form a 40 wt % solution while adding 1 wt % of the UV photoinitiator Irgacure 907. The mixture was stirred at 90° C. for 1 to 2 hours until completely dissolved. A toluene solution with 15% CdSe/ZnS (Ocean Nanotech QSP-620-10) quantum dots was then added. This solution will have a final concentration of 1 wt % quantum dots in the cured crosslinked cholesteric liquid crystal layer.

Figure 10:
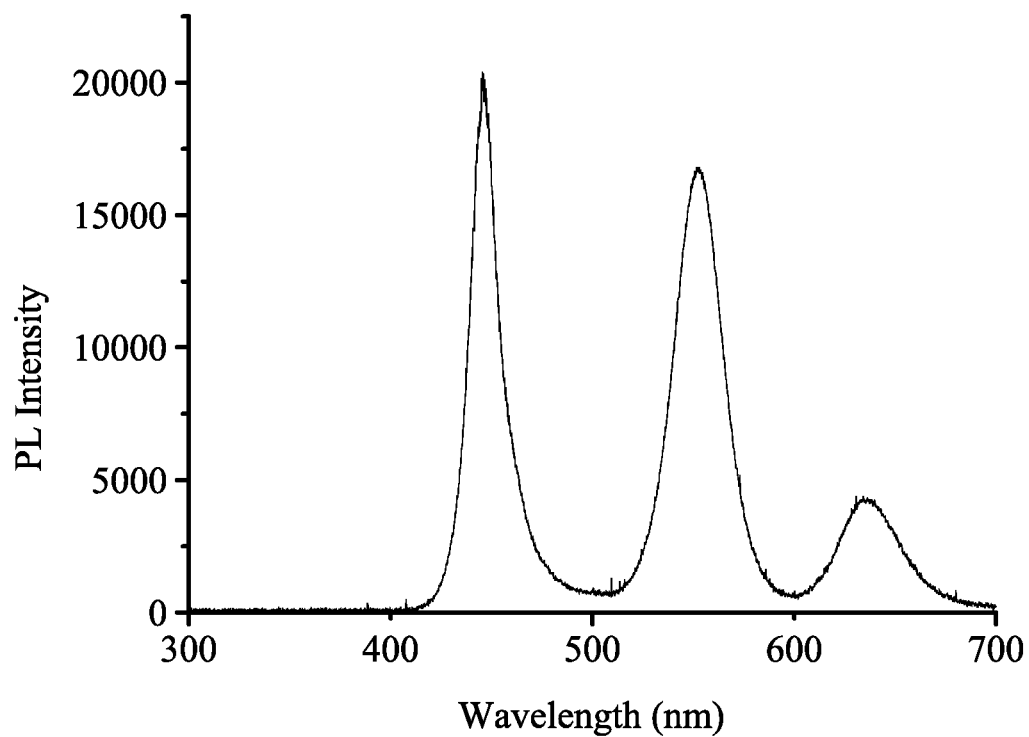
FIG. 10 is a graph showing the photoluminescence profile of an enhanced wavelength converting structure of Embodiment 5.

The quantum dots are capable of absorbing a blue LED light source in the range of between 420 nm and 460 nm and emitting green light with excitation wavelengths between 520 nm and 580 nm. The mixture was then stirred at room temperature for 24 hours. Next, the mixed solution was coated with a doctor blade onto a 50 μm-thick PET film and dried at 80° C. for 2 minutes, followed by irradiation with a UV light (100 W/cm$^2$) for 20 seconds to cure into a film with a thickness of about 6 to 7 μm. Upper and lower barrier layers are bonded to the film to form a wavelength converting structure containing CdSe/ZnS quantum dots. Furthermore, BASF 242 and BASF 756 with a weight ratio of 96:4 were mixed with toluene to form a 40 wt % solution while adding 1 wt % of the UV photoinitiator Irgacure 907. The mixture was stirred at 90° C. for 1 to 2 hours until completely dissolved. A toluene solution with 15% CdSe/ZnS (Ocean Nanotech QSP-620-10) quantum dots was then added. This solution will have a final concentration of 1 wt % quantum dots in the cured crosslinked cholesteric liquid crystal layer. The quantum dots are capable of absorbing a blue LED light source in the range of between 420 nm and 460 nm and emitting red light with excitation wavelengths between 600 nm and 680 nm. The mixture was then stirred at room temperature for 24 hours. Next, the mixed solution was coated with a doctor blade onto a 50 μm-thick PET film and dried at 80° C. for 2 minutes, followed by irradiation with a UV light (100 W/cm$^2$) for 20 seconds to cure into a film with a thickness of about 6 to 7 μm. The two films are bonded together with an optical adhesive. Thereafter, upper and lower barrier layers are bonded to the films to form a wavelength converting structure containing two crosslinked cholesteric liquid crystal layers. Its PL profile is shown in FIG. 10.

In this embodiment, the reflection band of the first crosslinked cholesteric liquid crystal layer is between 500 nm and 550 nm. When the blue LED light source is incident into the first crosslinked cholesteric liquid crystal layer, the CdSe/ZnS quantum dots dispersed therein absorb the blue light and emit green light in the range of between 520 nm and 580 nm. Both the blue and green lights then enter the second crosslinked cholesteric liquid crystal layer. As the quantum dots dispersed in the second crosslinked cholesteric liquid crystal layer mainly absorb the blue light and emit red light in the range of between 600 nm and 680 nm, and the reflection band of the second crosslinked cholesteric liquid crystal layer is mainly around 600 nm to 680 nm, the green light emitted by the CdSe/ZnS quantum dots in the first crosslinked cholesteric liquid crystal layer is able to pass through the second crosslinked cholesteric liquid crystal layer without being influenced and maintain wavelengths around 520 nm to 580 nm.

Figure 11:
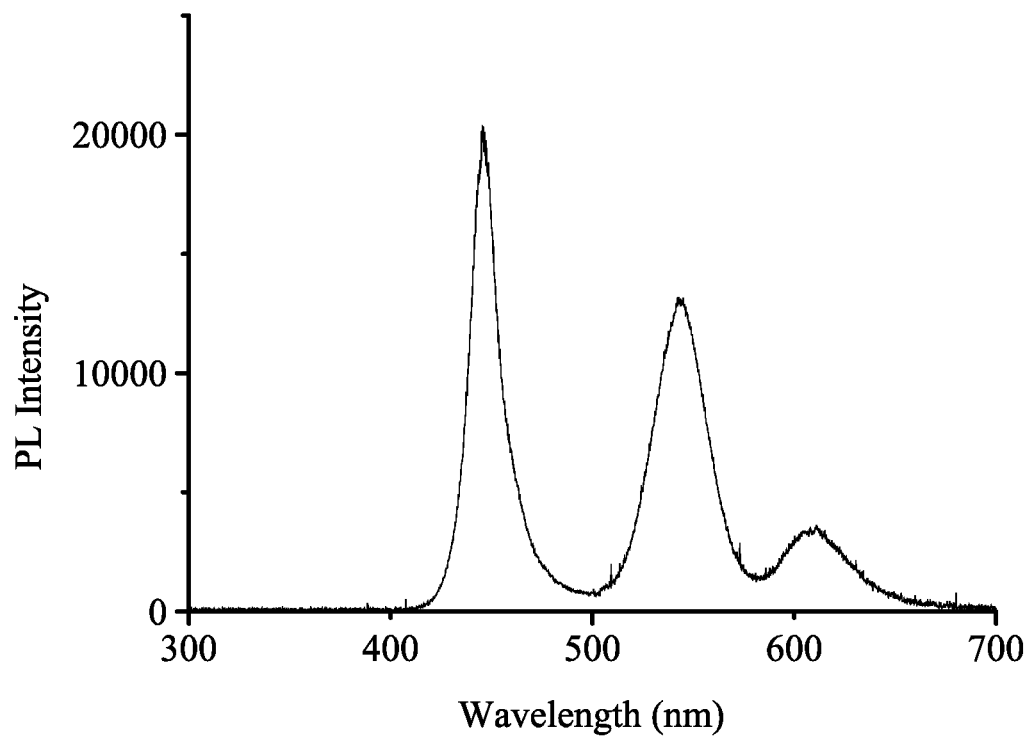
FIG. 11 is a graph showing the photoluminescence profile of an enhanced wavelength converting structure of Embodiment 6.

Embodiment 6—Preparation of Enhanced Wavelength Converting Structure Containing Two Types of Quantum Dots in One Single Layer BASF 242 and BASF 756 with a weight ratio of 95:5 were mixed with toluene to form a 40 wt % solution while adding 1 wt % of the UV photoinitiator Irgacure 907. The mixture was stirred at 90° C. for 1 to 2 hours until completely dissolved. A toluene solution with 15% InP/ZnS (SIGMA-ALDRICH, 56612 SIGMA) quantum dots was then added. This solution will have a final concentration of 1 wt % quantum dots in the cured crosslinked cholesteric liquid crystal layer. The quantum dots are capable of absorbing a blue LED light source in the range of between 420 nm and 460 nm and emitting green light with excitation wavelengths between 520 nm and 580 nm. Next, a toluene solution with 15% InP/ZnS (SIGMA-ALDRICH, Product No. 776777 ALDRICH) quantum dots was further added. This solution will have a final concentration of 1 wt % quantum dots in the cured crosslinked cholesteric liquid crystal layer. The quantum dots are capable of absorbing a blue LED light source in the range of between 420 nm and 460 nm and emitting red light with excitation wavelengths between 600 nm and 680 nm. The mixture was then stirred at room temperature for 24 hours. Next, the mixed solution was coated with a doctor blade onto a 50 μm-thick PET film and dried at 80° C. for 2 minutes, followed by irradiation with a UV light (90 W/cm$^2$) for 30 seconds to cure into a film with a thickness of about 6 to 7 μm. Upper and lower barrier layers are bonded to the film to form a wavelength converting structure containing two types of quantum dots in a single layer. FIG. 11 shows the PL profile of the wavelength converting structure containing two types of quantum dots in a single layer. The enhanced wavelength converting structures of the present disclosure can be further combined with an optical film, such as a prism-film brightness enhancement film, a cholesteric liquid crystal reflective polarizer, a multilayer reflective polarizer or a diffuser film, to form a light emitting film. This significantly reduces the amount of quantum dots being used, while still maintaining high quantum efficiency, thereby increasing luminance gain.

Application Examples 1 and 2

Figure 12A:
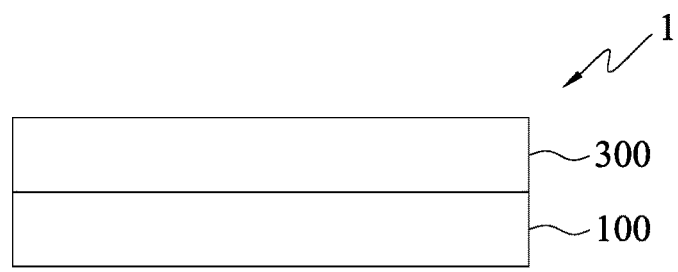
FIGS. 12A and 12B are schematic diagrams illustrating Application Examples 1 and 2 of the enhanced wavelength converting structure of the present disclosure, respectively.
Figure 12B:
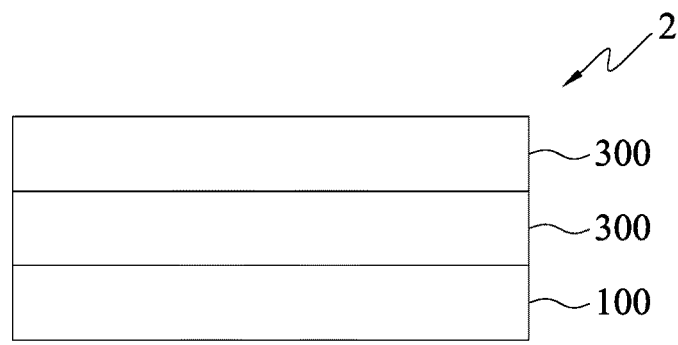
Figure 13:
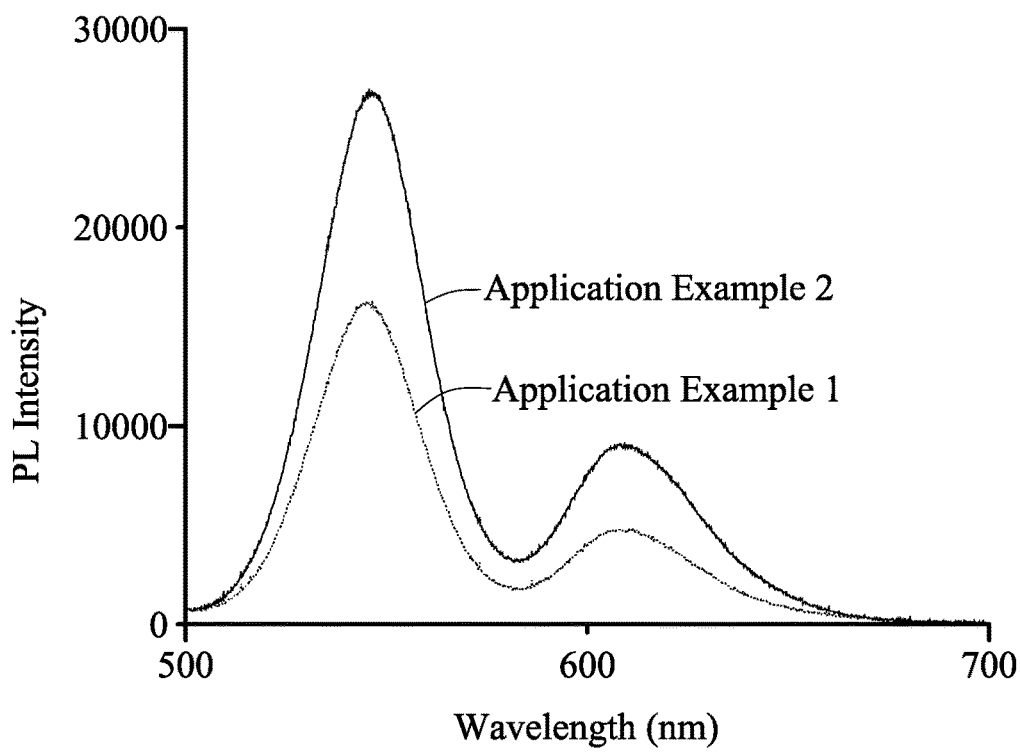
FIG. 13 is a graph showing the photoluminescence profiles of the enhanced wavelength converting structures of Application Examples 1 and 2.

Application Examples 1 and 2 are shown in FIGS. 12A and 12B. One and two layers of prism film-brightness enhancement film(s) (BEF(s)) 300 (commercially available from 3M, Product No. Vikuiti BEFII) were provided on one side of the enhanced wavelength converting structure 100 of the wavelength converting structure containing two types of quantum dots in a single layer as described in Embodiment 6 to form luminescent films 1 and 2 as shown in FIGS. 12A and 12B, respectively. Their PL profiles are shown in FIG. 13.

Application Examples 3 to 5

Figure 14A:
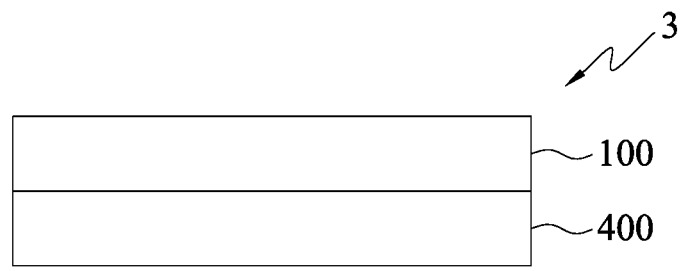
FIGS. 14A, 14B and 14C are schematic diagrams illustrating Application Examples 3 to 5 of the enhanced wavelength converting structure of the present disclosure, respectively.
Figure 14B:
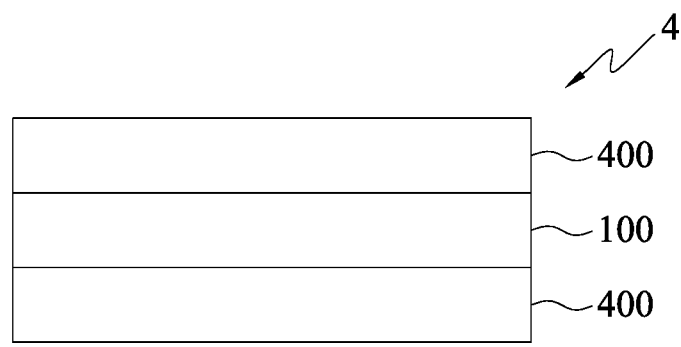
Figure 14C:
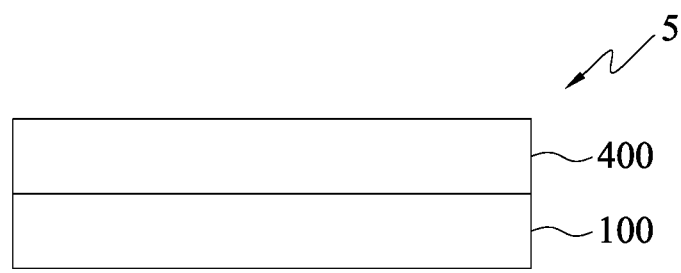
Figure 15:
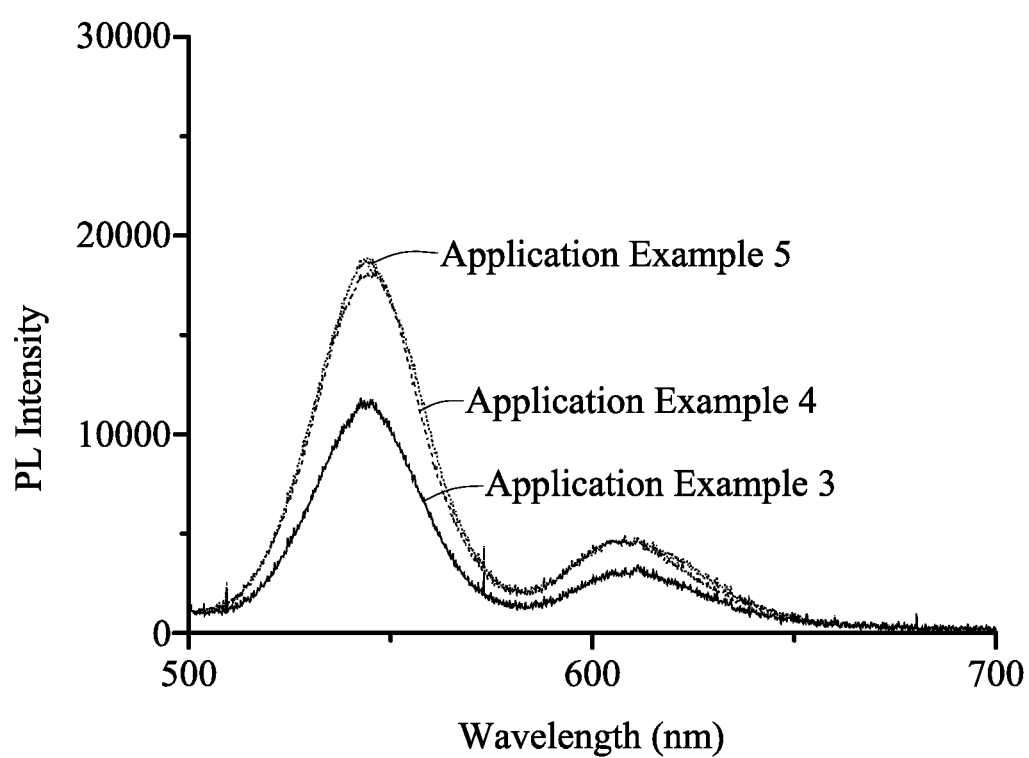
FIG. 15 is a graph showing the photoluminescence profiles of the enhanced wavelength converting structures of Application Examples 3 to 5.

Application Examples 3 to 5 are shown in FIGS. 14A to 14C. One cholesteric liquid crystal reflective polarizer 400 (prepared in accordance with the method proposed in U.S. Pat. No. 6,721,030) was provided on one side of the enhanced wavelength converting structure 100 of the wavelength converting structure containing two types of quantum dots in a single layer as described in Embodiment 6 to form luminescent films 3 and 5 as shown in FIGS. 14A and 14C, while said cholesteric liquid crystal reflective polarizer was provided on each side of the enhanced wavelength converting structure 100 to form a luminescent film 4 of Application Example 4 as shown in FIG. 14B. Their PL profiles are shown in FIG. 15.

Application Examples 6 to 8

Figure 16A:
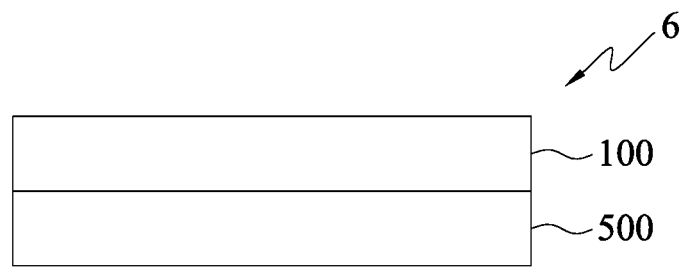
FIGS. 16A, 16B and 16C are schematic diagrams illustrating Application Examples 6 to 8 of the enhanced wavelength converting structure of the present disclosure, respectively.
Figure 16B:
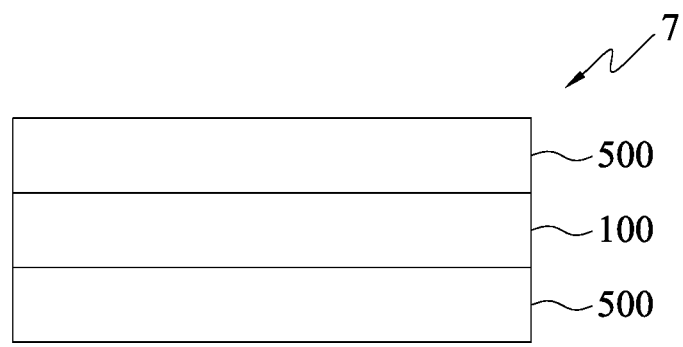
Figure 16C:
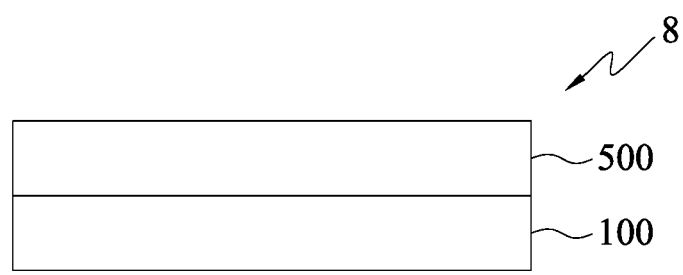
Figure 17:
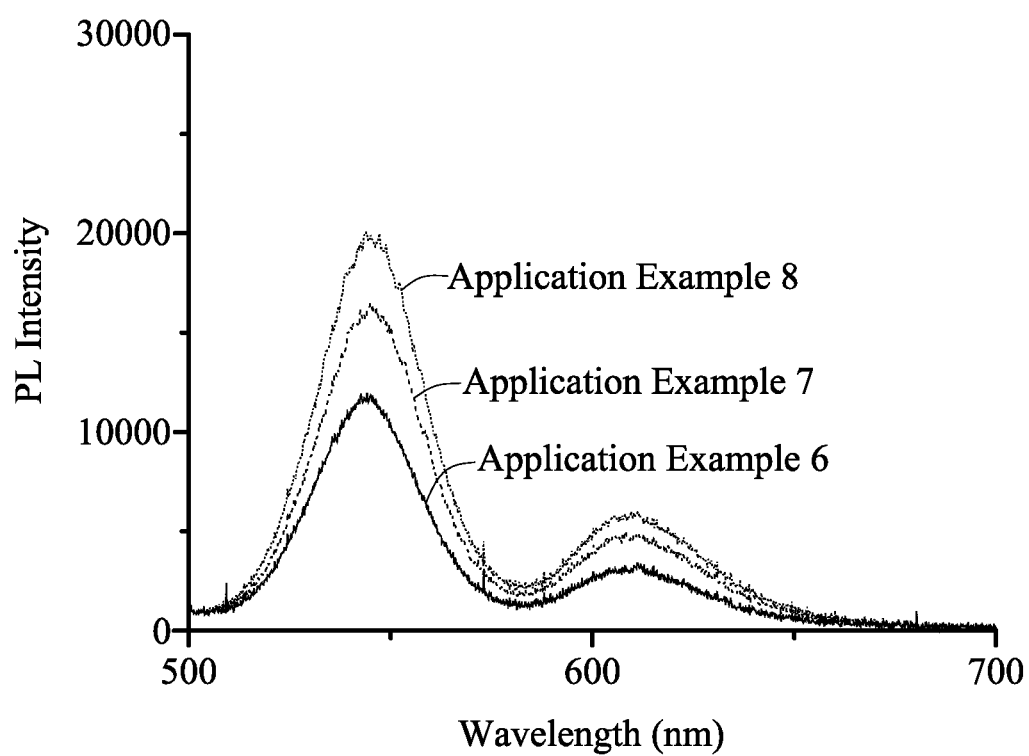
FIG. 17 is a graph showing the photoluminescence profiles of the enhanced wavelength converting structures of Application Examples 6 to 8.

One dual brightness enhancement film (DBEF) 500 (commercially available from 3M, Product No. Vikuiti DBEF) was provided on one side of the enhanced wavelength converting structure 100 of the wavelength converting structure containing two types of quantum dots in a single layer as described in Embodiment 6 to form luminescent films 6 and 8 of Application Examples 6 and 8 as shown in FIGS. 16A and 16C, while said DBEF 500 was provided on each side of the wavelength converting structure 100 as described in Embodiment 6 to form a luminescent film 7 of Application Example 7 as shown in FIG. 16B. Their PL profiles are shown in FIG. 17.

Application Examples 9 to 11

Figure 18A:
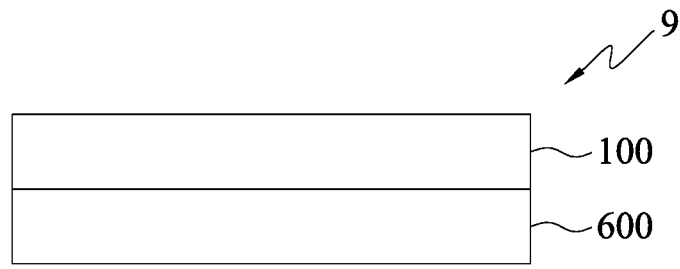
FIGS. 18A, 18B and 18C are schematic diagrams illustrating Application Examples 9 to 11 of the enhanced wavelength converting structure of the present disclosure, respectively.
Figure 18B:
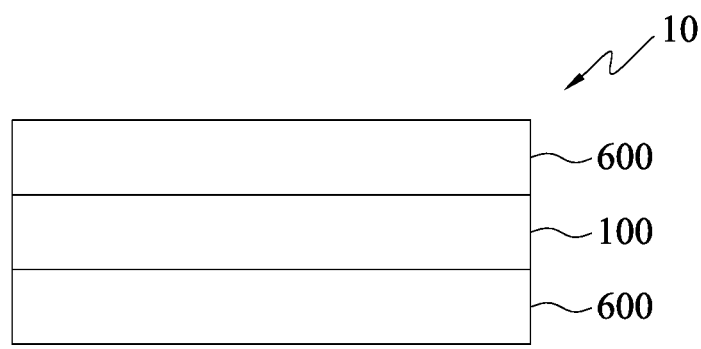
Figure 18C:
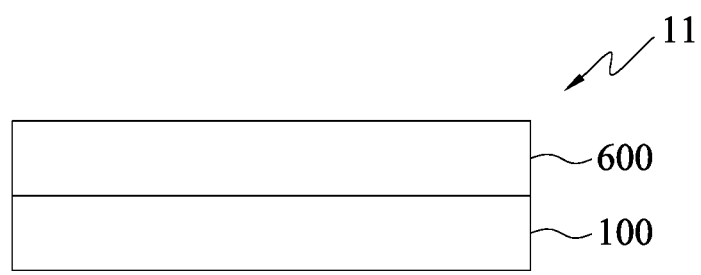
Figure 19:
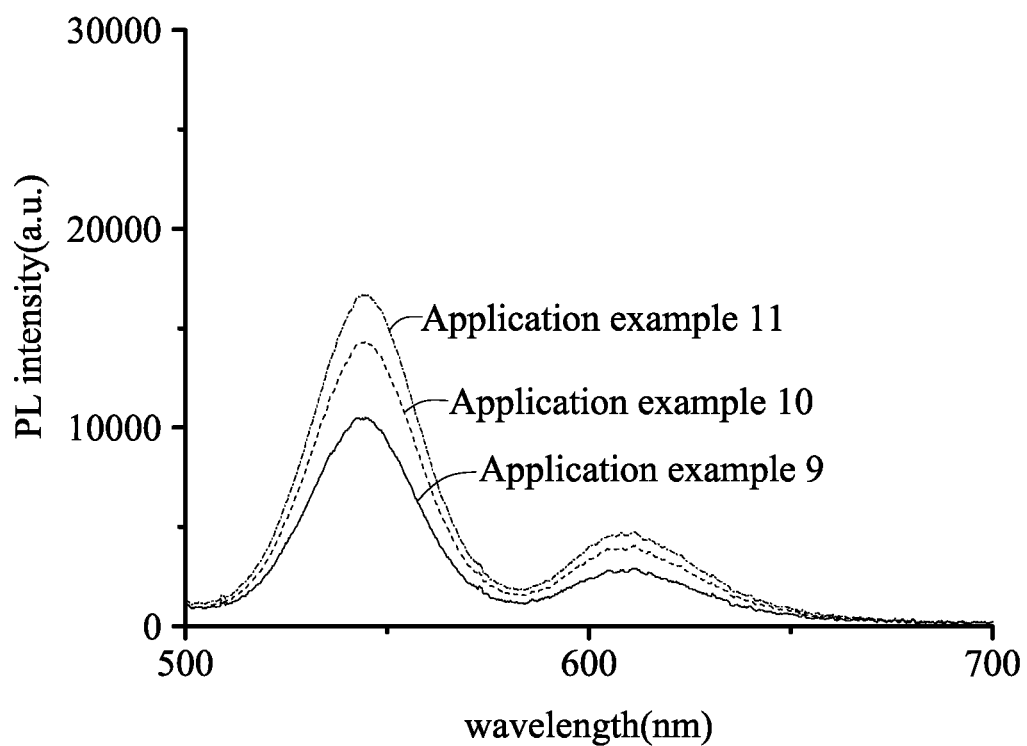
FIG. 19 is a graph showing the photoluminescence profiles of the enhanced wavelength converting structures of Application Examples 9 to 11.

One diffuser film 600 (commercially available from Wah Hong Industrial Corp.) was provided on one side of the enhanced wavelength converting structure 100 of the wavelength converting structure containing two types of quantum dots in a single layer as described in Embodiment 6 to form luminescent films 9 and 11 of Application Examples 9 and 11 as shown in FIGS. 18A and 18C, while said DBEF 600 was provided on each side of the wavelength converting structure 100 as described in Embodiment 6 to form a luminescent film 10 of Application Example 10 as shown in FIG. 18B. Their PL profiles are shown in FIG. 19.

Comparative Example 1—Preparation of Wavelength Converting Structure Containing Only CdSe/ZnS Quantum Dot Compound A toluene solution with 15% CdSe/ZnS (Ocean Nanotech, Product No. QSP-540-10) quantum dots was added to the UV curing resin UV298 (commercially available from CHEM-MAT Technologies Co. Ltd.). This solution will have a final concentration of 1 wt % quantum dots in the cured film. The quantum dots are capable of absorbing a blue LED light source in the range of between 420 nm and 460 nm and emitting green light with excitation wavelengths between 520 nm and 580 nm. The mixture was then stirred at room temperature for 24 hours. Next, the mixed solution was coated with a doctor blade onto a 50 μm-thick PET film and dried at 80° C. for 2 minutes, followed by irradiation with a UV light (100 W/cm$^2$) for 20 seconds to cure into a film with a thickness of about 6 to 7 μm. Upper and lower barrier layers are then bonded to the film to form a wavelength converting structure of Comparative Example 1.

Comparative Example 2—Preparation of Wavelength Converting Structure Containing Only PbS/ZnS Quantum Dot Compound A toluene solution with 15% PbS/ZnS quantum dots was added to the UV curing resin UV298. This solution will have a final concentration of 1 wt % quantum dots in the cured film. The quantum dots are capable of absorbing a LED light source in the range of between 700 nm and 760 nm and emitting NIR light with excitation wavelengths between 800 nm and 900 nm. The mixture was then stirred at room temperature for 24 hours. Next, the mixed solution was coated with a doctor blade onto a 50 μm-thick PET film and dried at 80° C. for 2 minutes, followed by irradiation with a UV light (100 W/cm$^2$) for 20 seconds to cure into a film with a thickness of about 6 to 7 μm. Upper and lower barrier layers are then bonded to the film to form a wavelength converting structure of Comparative Example 2.

Comparative Example 3—Preparation of Wavelength Converting Structure Containing Only InP/ZnS Quantum Dot Compound A toluene solution with 15% InP/ZnS quantum dots was added to the UV curing resin UV298. This solution will have a final concentration of 1 wt % quantum dots in the cured film. The quantum dots are capable of absorbing a blue LED light source in the range of between 420 nm and 460 nm and emitting green light with excitation wavelengths between 520 nm and 580 nm. The mixture was then stirred at room temperature for 24 hours. Next, the mixed solution was coated with a doctor blade onto a 50 μm-thick PET film and dried at 80° C. for 2 minutes, followed by irradiation with a UV light (100 W/cm$^2$) for 20 seconds to cure into a film with a thickness of about 6 to 7 μm. Upper and lower barrier layers are then bonded to the film to form a wavelength converting structure of Comparative Example 3.

Comparative Example 4—Preparation of Wavelength Converting Structure Containing Only CdSe/ZnS Quantum Dot Compound A toluene solution with 15% CdSe/ZnS quantum dots was added to the UV curing resin UV298. This solution will have a final concentration of 1 wt % quantum dots in the cured film. The quantum dots are capable of absorbing a blue LED light source in the range of between 420 nm and 460 nm and emitting red light with excitation wavelengths between 600 nm and 680 nm. The mixture was then stirred at room temperature for 24 hours. Next, the mixed solution was coated with a doctor blade onto a 50 μm-thick PET film and dried at 80° C. for 2 minutes, followed by irradiation with a UV light (100 W/cm$^2$) for 20 seconds to cure into a film with a thickness of about 6 to 7 μm. Upper and lower barrier layers are then bonded to the film to form a wavelength converting structure of Comparative Example 4.

Figure 20:
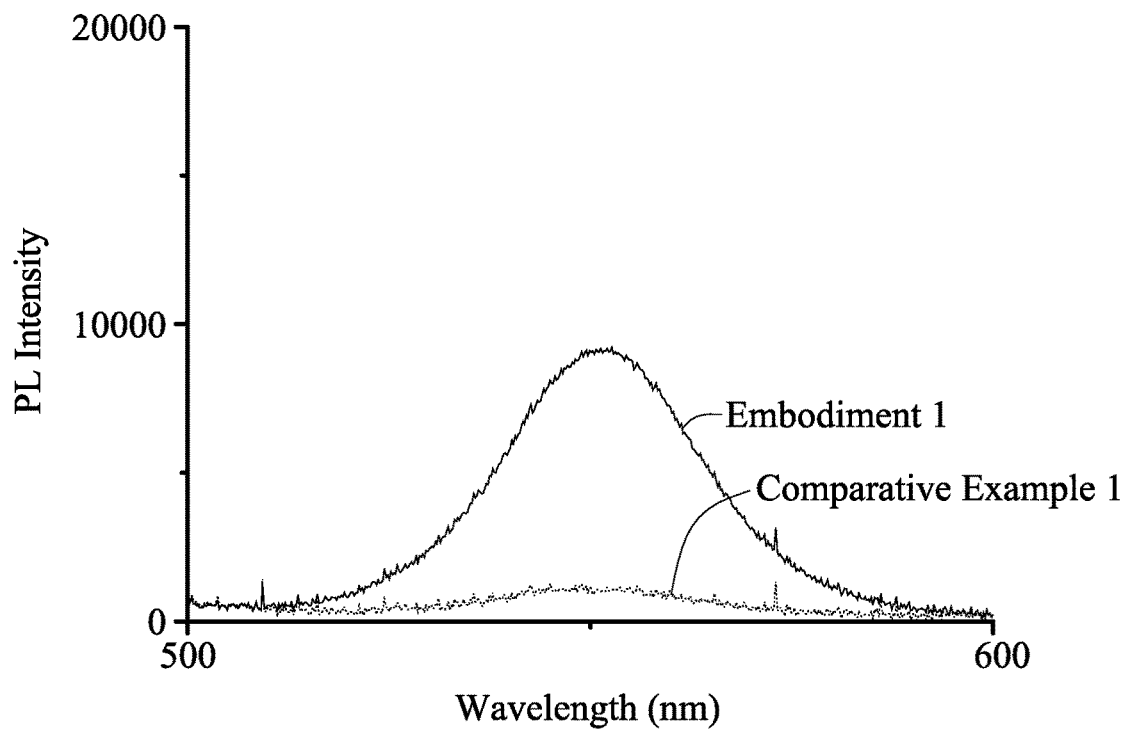
FIG. 20 is a graph showing the photoluminescence profiles of an enhanced wavelength converting structure of Embodiment 1 and a wavelength converting structure of Comparative Example 1.

FIG. 20 is a graph showing the comparison between the PL profiles of the wavelength converting structures of Embodiment 1 and Comparative Example 1. As both of these two wavelength converting structures use the same CdSe/ZnS quantum dots, the result shows that their PL wavelengths are both positioned around 550 nm. However, it can be seen that in terms of the PL intensity, the PL intensity of the wavelength converting structure of Embodiment 1 is about 8 times as compared to that of Comparative Example 1. This is attributed to the fact that, in the wavelength converting structure of Embodiment 1, the cholesteric liquid crystal provides the microcavities mechanism, such that the excitation light of the quantum dots and the microcavities of the cholesteric liquid crystal are coupled to each other, thereby increasing the coherency as well as the intensity of the excitation light.

Figure 21:
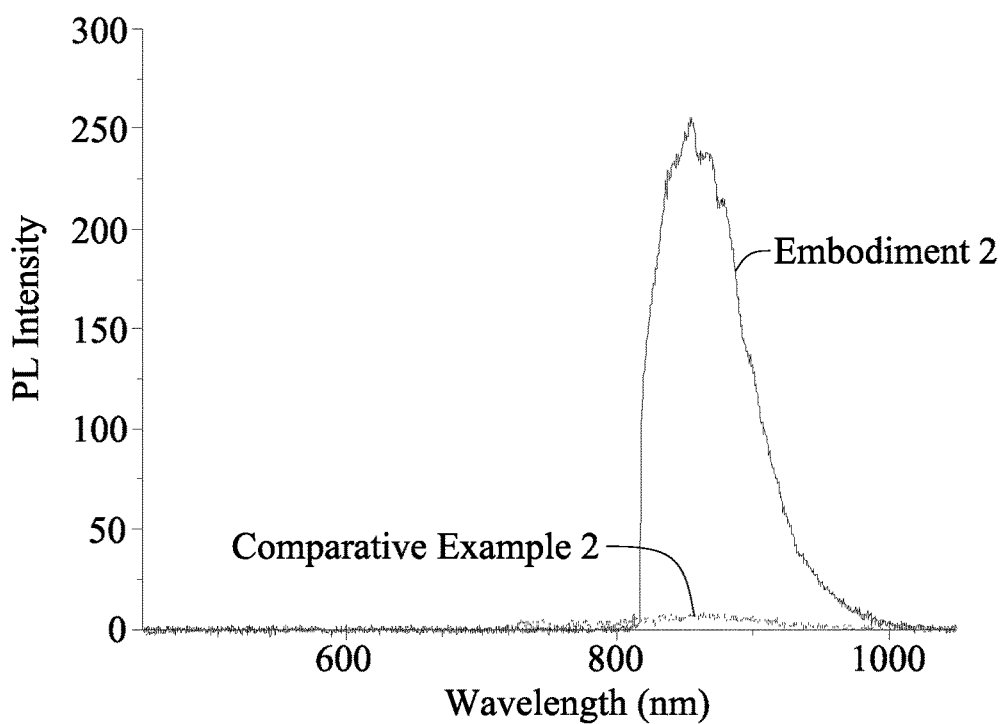
FIG. 21 is a graph showing the photoluminescence profiles of an enhanced wavelength converting structure of Embodiment 2 and a wavelength converting structure of Comparative Example 2.

FIG. 21 is a graph showing the comparison between the PL profiles of the wavelength converting structures of Embodiment 2 and Comparative Example 2. As both of these two wavelength converting structures use the same PbS/ZnS quantum dots, the result shows that their PL wavelengths are both positioned around 850 nm. However, it can be seen that in terms of the PL intensity, the PL intensity of the wavelength converting structure of Embodiment 2 is considerably higher than that of Comparative Example 2.

Figure 22:
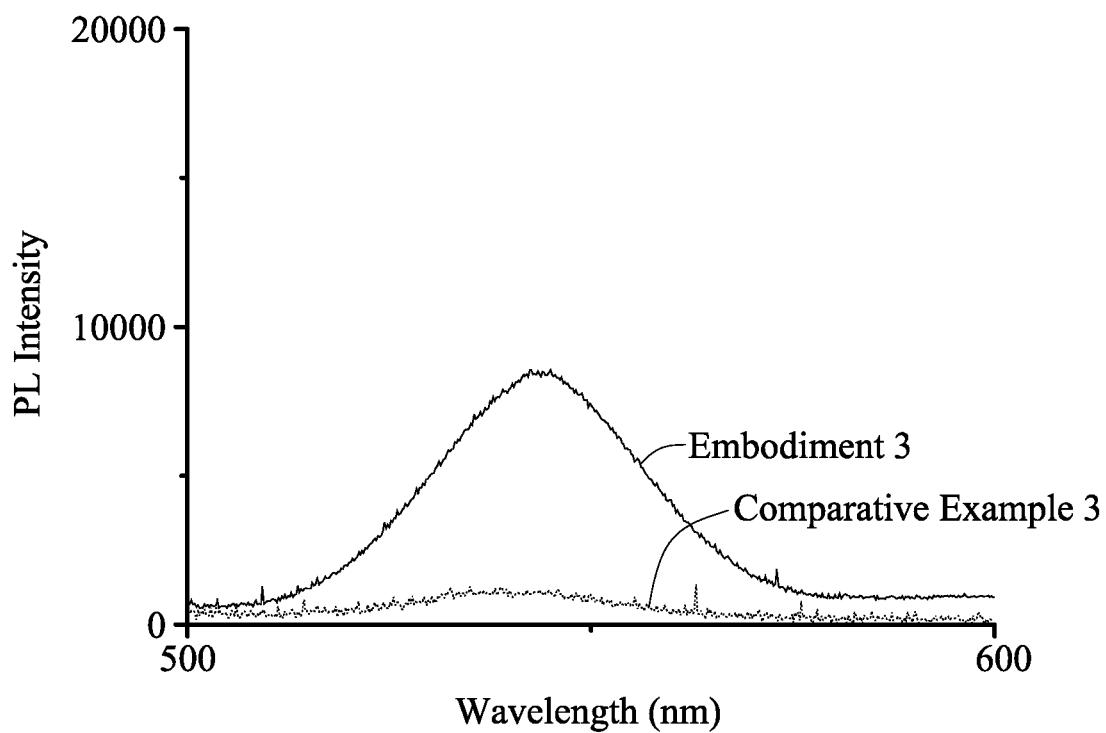
FIG. 22 is a graph showing the photoluminescence profiles of an enhanced wavelength converting structure of Embodiment 3 and a wavelength converting structure of Comparative Example 3.

FIG. 22 is a graph showing the comparison between the PL profiles of the wavelength converting structures of Embodiment 3 and Comparative Example 3. As both of these two wavelength converting structures use the same InP/ZnS quantum dots, the result shows that their PL wavelengths are both positioned around 520 nm. However, it can be seen that in terms of the PL intensity, the PL intensity of the wavelength converting structure of Embodiment 3 is about 8 times as compared to that of Comparative Example 3. This is attributed to the fact that, in the wavelength converting structure of Embodiment 3, the cholesteric liquid crystal provides the microcavities mechanism, such that the excitation light of the quantum dots and the microcavities of the cholesteric liquid crystal are coupled to each other, thereby increasing the coherency as well as the intensity of the excitation light.

Figure 23:
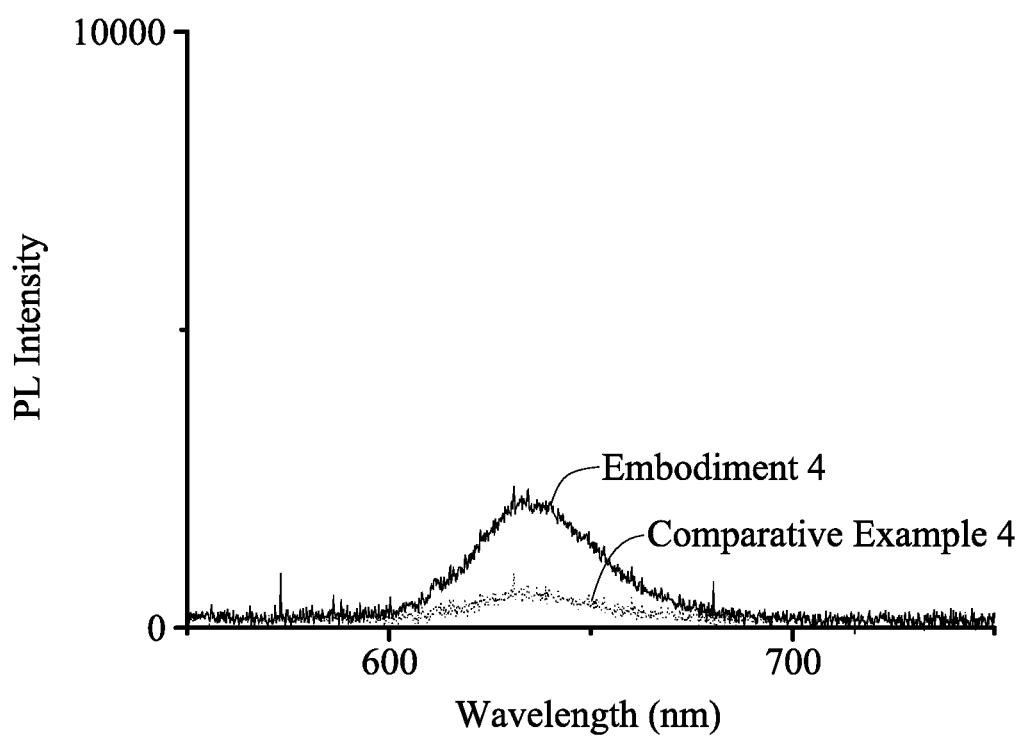
FIG. 23 is a graph showing the photoluminescence profiles of an enhanced wavelength converting structure of Embodiment 4 and a wavelength converting structure of Comparative Example 4.

FIG. 23 is a graph showing the comparison between the PL profiles of the wavelength converting structures of Embodiment 4 and Comparative Example 4. As both of these two wavelength converting structures use the same CdSe/ZnS quantum dots, the result shows that their PL wavelengths are both positioned around 630 nm. However, it can be seen that in terms of the PL intensity, the PL intensity of the wavelength converting structure of Embodiment 4 is about 3.7 times as compared to that of Comparative Example 4. This is attributed to the fact that, in the wavelength converting structure of Embodiment 4, the cholesteric liquid crystal provides the microcavities mechanism, such that the excitation light of the quantum dots and the microcavities of the cholesteric liquid crystal are coupled to each other, thereby increasing the coherency as well as the intensity of the excitation light.

In summary, in the enhanced wavelength converting structure of the present disclosure, when the quantum dots in the crosslinked cholesteric liquid crystal layer have absorbed light waves of a higher energy, the electrons can jump to a higher energy level, and when the quantum dots return from the higher energy level to a lower energy level, the light having a longer wavelength will be emitted. Quantum dots with different particle sizes will emit light with different wavelengths. In addition, since the crosslinked cholesteric liquid crystal layer follows the Bragg's law, the wavelength range of the reflected lights can be adjusted by adjusting the pitch of the liquid crystal. Furthermore, the cholesteric liquid crystal provides the microcavities mechanism, such that the excitation light of the quantum dots and the microcavities of the cholesteric liquid crystal are coupled to each other, thereby increasing the coherency as well as the intensity of the excitation light. Moreover, the quantum dots are dispersed at a nanoscale in the resin, and the high film transparency reduces optical loss. Therefore, the enhanced wavelength converting structure of the present disclosure can significantly reduce the amount of quantum dots being used while still maintaining high quantum efficiency.

The above embodiments are only used to illustrate the principles of the present invention, and should not be construed as to limit the present invention in any way. The above embodiments can be modified by those with ordinary skill in the art without departing from the scope of the present invention as defined in the following appended claims.

What is claimed is:

1. An enhanced wavelength converting structure, comprising:
   a first crosslinked cholesteric liquid crystal layer having a first pitch; and
   a plurality of first quantum dots dispersed in the first crosslinked cholesteric liquid crystal layer, wherein when a first light is incident into the enhanced wavelength converting structure, the plurality of first quantum dots are excited by the first light and emit a second light of a wavelength different from a wavelength of the first light, wherein the wavelength of the second light is optically coupled to the first pitch of the first crosslinked cholesteric liquid crystal layer.

2. The enhanced wavelength converting structure of claim 1, further comprising a substrate, wherein the first crosslinked cholesteric liquid crystal layer is disposed on the substrate.

3. The enhanced wavelength converting structure of claim 2, wherein the substrate is a barrier layer.

4. The enhanced wavelength converting structure of claim 2, further comprising a barrier layer, wherein the barrier layer is disposed on the first crosslinked cholesteric liquid crystal layer, and the first crosslinked cholesteric liquid crystal layer is sandwiched between the substrate and the barrier layer.

5. The enhanced wavelength converting structure of claim 1, wherein the first quantum dots comprising materials selected from a Group II-VI compound, a Group III-V compound or a Group IV-VI compound.

6. The enhanced wavelength converting structure of claim 1, wherein the first quantum dots having core or core-shell structures capped with ligands.

7. The enhanced wavelength converting structure of claim 5, wherein the Group II-VI compound is CdSe.

8. The enhanced wavelength converting structure of claim 5, wherein the Group IV-VI compound is PbS.

9. The enhanced wavelength converting structure of claim 5, wherein the Group III-V compound is InP.

10. The enhanced wavelength converting structure of claim 1, wherein a wavelength range of the first light is between 420 nm and 460 nm.

11. The enhanced wavelength converting structure of claim 1, wherein a wavelength range of the second light is between 520 nm and 580 nm.

12. The enhanced wavelength converting structure of claim 1, further comprising a plurality of second quantum dots dispersed in the first crosslinked cholesteric liquid crystal layer, the second quantum dots being different from the first quantum dots.

13. The enhanced wavelength converting structure of claim 12, wherein the second quantum dots comprising materials selected from a Group II-VI compound, a Group III-V compound or a Group IV-VI compound.

14. The enhanced wavelength converting structure of claim 12, wherein the second quantum dots having core or core-shell structures capped with ligands.

15. The enhanced wavelength converting structure of claim 13, wherein the Group II-VI compound is CdSe.

16. The enhanced wavelength converting structure of claim 13, wherein the Group IV-VI compound is PbS.

17. The enhanced wavelength converting structure of claim 13, wherein the Group III-V compound is InP.

18. The enhanced wavelength converting structure of claim 1, further comprising:
   a second crosslinked cholesteric liquid crystal layer disposed on the first crosslinked cholesteric liquid crystal layer; and
   a plurality of second quantum dots dispersed in the second crosslinked cholesteric liquid crystal layer, wherein when the first light is incident into the enhanced wavelength converting structure, the plurality of second quantum dots are excited by the first light and emit a third light of a wavelength different from the wavelength of the first light.

19. The enhanced wavelength converting structure of claim 18, wherein the second quantum dots comprising materials selected from a Group II-VI compound, a Group III-V compound or a Group IV-VI compound, and the second quantum dots are different from the first quantum dots.

20. The enhanced wavelength converting structure of claim 18, wherein the second quantum dots having core or core-shell structures capped with ligands.

21. The enhanced wavelength converting structure of claim 19, wherein the Group II-VI compound is CdSe.

22. The enhanced wavelength converting structure of claim 19, wherein the Group IV-VI compound is PbS.

23. The enhanced wavelength converting structure of claim 19, wherein the Group III-V compound is InP.

24. The enhanced wavelength converting structure of claim 18, wherein a wavelength range of the third light is between 600 nm and 680 nm.

25. The enhanced wavelength converting structure of claim 18, wherein a pitch of the second crosslinked cholesteric liquid crystal layer is different from a pitch of the first crosslinked cholesteric liquid crystal layer.

26. The enhanced wavelength converting structure of claim 1, wherein the first crosslinked cholesteric liquid crystal layer includes a mixture of a crosslinked liquid crystal and an optically active substance.

27. A luminescent film, comprising:
the enhanced wavelength converting structure of claim 1; and
at least one optical film disposed on a surface of the enhanced wavelength converting structure.

28. The luminescent film of claim 27, wherein the optical film is a prism brightness enhancement film, a cholesteric liquid crystal reflective polarizer, a multilayer reflective polarizer, or a diffuser film.

29. A display backlighting unit, comprising:
at least one primary light source emitting primary light;
a light guide panel (LGP) optically coupled to the at least one primary light source and configured to uniformly transmit the primary light through the LGP; and
the enhanced wavelength converting structure of claim 1 disposed over the LGP.

* * * * *